US012726677B2

(12) United States Patent
Agrawal et al.

(10) Patent No.: US 12,726,677 B2
(45) Date of Patent: Sep. 1, 2026

(54) METHOD TO MANAGE A SHARED OR PRESENTED MEDIA CONTENT BASED ON VIEWER'S PERSONA

(71) Applicant: MOTOROLA MOBILITY LLC, Wilmington, DE (US)

(72) Inventors: Amit Kumar Agrawal, Bangalore (IN); Krishnan Raghavan, Bangalore (IN); Hariprasad Shanbhogue Alampady, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/794,802

(22) Filed: Aug. 5, 2024

(65) Prior Publication Data

US 2026/0039912 A1 Feb. 5, 2026

(51) Int. Cl.
*H04N 21/454* (2011.01)
*H04N 21/45* (2011.01)

(52) U.S. Cl.
CPC ....... *H04N 21/454* (2013.01); *H04N 21/4532* (2013.01)

(58) Field of Classification Search
CPC ......................... H04N 21/454; H04N 21/4532
See application file for complete search history.

(56) References Cited

U.S. PATENT DOCUMENTS

2009/0320059 A1* 12/2009 Bolyukh ................ H04N 7/025
2010/0094157 A1* 4/2010 Kummer
2011/0140840 A1* 6/2011 Hardacker ............... H04N 5/70
2017/0272818 A1* 9/2017 Gattis .............. H04N 21/45452

* cited by examiner

*Primary Examiner* — Anthony Bantamoi
(74) *Attorney, Agent, or Firm* — Isidore PLLC

(57) ABSTRACT

An electronic device and method provide autonomous evaluating and altering of selected media content based on the personal preference of at least one second person. The device is configured to, in response to a trigger to share selected media content to at least one second person: (i) determine whether a personal preference has been established for the at least one second person, the personal preference being correlated to a preference to avoid exposure to specific types of representations within media content; and (ii) in response to determining that the personal preference has been established for the at least one second person: (a) alter the selected media content using the personal preference of the at least one second person to generate corresponding altered media content; and (b) provide the corresponding altered media content in lieu of the selected media content for presenting to the at least one second person.

19 Claims, 11 Drawing Sheets

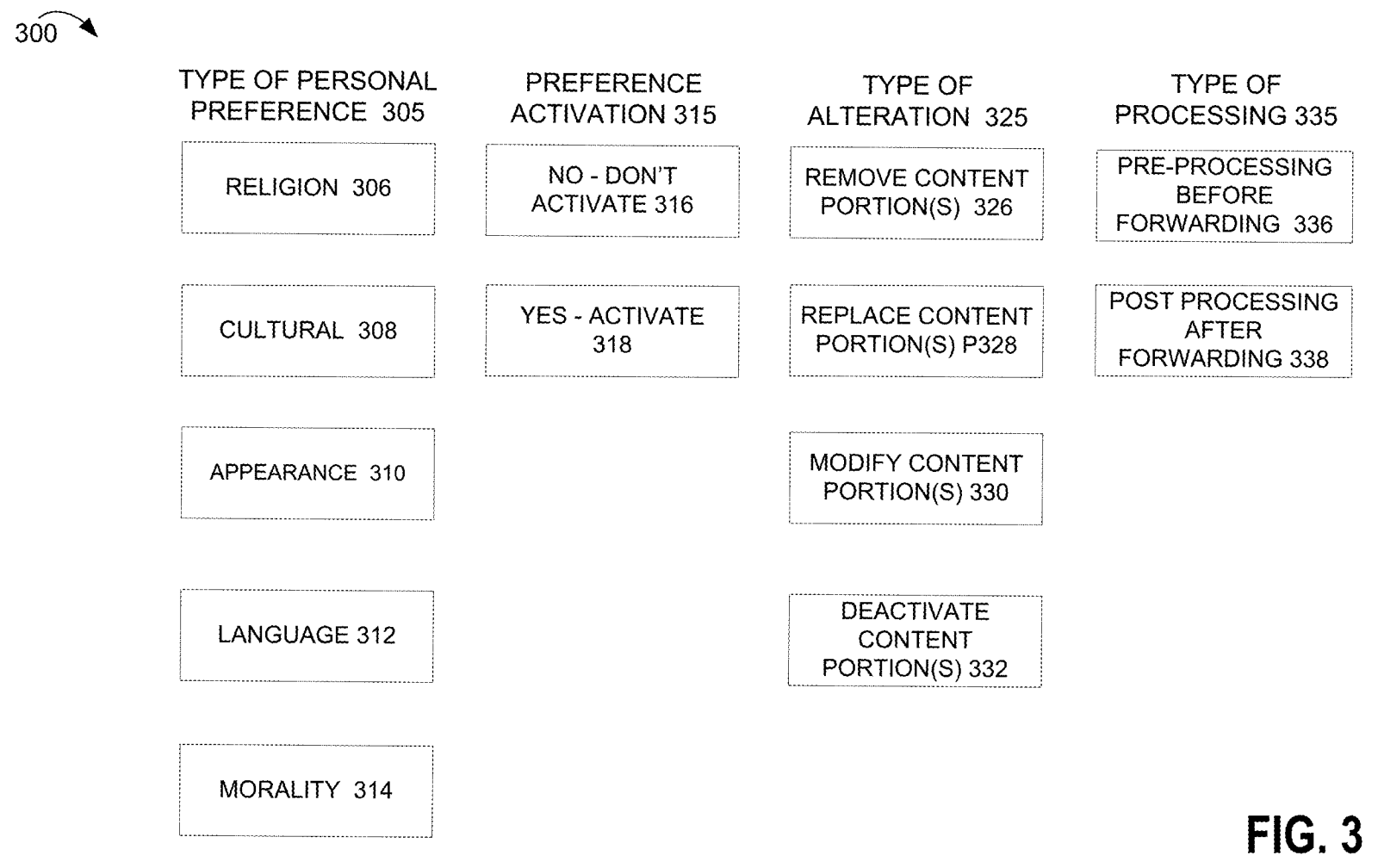

300

TYPE OF PERSONAL PREFERENCE 305

RELIGION 306

CULTURAL 308

APPEARANCE 310

LANGUAGE 312

MORALITY 314

PREFERENCE ACTIVATION 315

NO - DON'T ACTIVATE 316

YES - ACTIVATE 318

TYPE OF ALTERATION 325

REMOVE CONTENT PORTION(S) 326

REPLACE CONTENT PORTION(S) P328

MODIFY CONTENT PORTION(S) 330

DEACTIVATE CONTENT PORTION(S) 332

TYPE OF PROCESSING 335

PRE-PROCESSING BEFORE FORWARDING 336

POST PROCESSING AFTER FORWARDING 338

FIG. 3

500
501A
Seventh Altered Media Content
505
Joining
520A
580
525A
530A
510A 550
501B
Eighth Altered Media Content
506
520B
Departing
585
525B
530B
510B

METHOD TO MANAGE A SHARED OR PRESENTED MEDIA CONTENT BASED ON VIEWER'S PERSONA

BACKGROUND

1. Technical Field

The present disclosure relates generally to electronic devices that store media content, and in particular to electronic devices that present and/or share media content for viewer consumption.

2. Description of the Related Art

Portable electronic communication devices, particularly smartphones, have become ubiquitous. People all over the world use such devices to stay connected. With incorporation of graphical displays and cameras, mobile devices are used for capturing and sharing media content such as photographic images, voice recordings, and video recordings. The sharing of the media content can be used with a primary display or a secondary display of a sharing electronic device or with a display of another electronic device that receives the media content being shared. Generally, the media content being shared is similar to when the content was originally captured, and the same media content can generate different reactions or emotions from different people.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 depicts a table with examples of different factors that can be used to alter a selected media content using the personal preferences of at least one second person, according to one or more embodiments.

DETAILED DESCRIPTION

Figure 1:
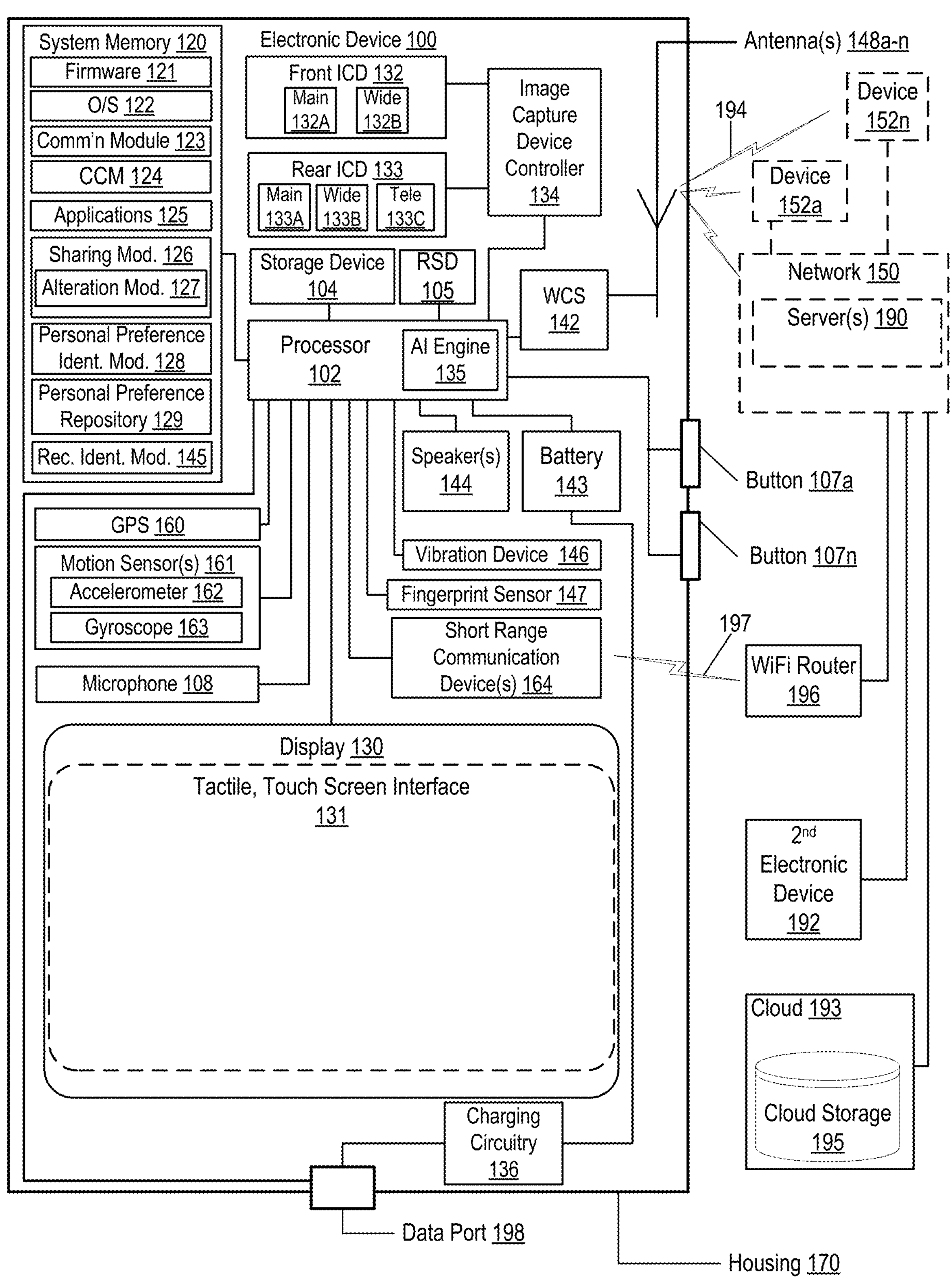
FIG. 1 depicts an example primary electronic device within which various aspects of the disclosure can be implemented to selectively alter media content being shared with at least one second person, according to one or more embodiments.

The present disclosure provides an electronic device, a method, and a computer program product that enable autonomous detection and alteration/modification of a selected media content that is determined to not align with the personal preference of at least one second person that the selected media content is being presented to or is being shared with. The alteration/modification of the selected media content can be performed based on the personal preference of the at least one second person.

According to one or more embodiments, the electronic device includes a memory that stores one or more media content, a communication subsystem configurable to connect the electronic device to one or more second devices having at least one display, and a controller communicatively connected to the memory and the communications subsystem, and which is configured to cause the electronic device to: in response to a trigger to share/present selected media content among the one or more media content to at least one second person: (i) determine whether a personal preference has been established for the at least one second person, the personal preference being correlated to a preference of the at least one second person to avoid exposure to specific types of representations that can exist within the selected media content; and (ii) in response to determining that the personal preference has been established for the at least one second person: (a) alter the selected media content based on the personal preference of the at least one second person to generate corresponding altered media content; and (b) provide the corresponding altered media content in lieu of the selected media content for presenting to the at least one second person. In one or more embodiments, the electronic device is configured to forward the altered media content to a second electronic device of the at least one second person for presenting at a second electronic device. In one or more embodiment, the electronic device presents the altered media content on a display of the electronic device based on detecting the at least one second person viewing or within a view range of the display.

According to one or more embodiments, a method provides computer-implemented processes for enabling autonomous alteration of at least one portion of a selected media content when the processor of the electronic device determines that the at least one portion of the selected media content is inconsistent with the personal preference of at least one second person that the at least one portion of the selected media content is being presented to or is being shared with. The method includes receiving a trigger to share/present selected media content among the one or more media content to at least one second person; determining whether a personal preference has been established for the at least one second person, the personal preference being correlated to a preference of the at least one second person to avoid exposure to specific types of representations within the selected media content; and in response to determining that the personal preference has been established for the at least one second person: (a) altering the selected media content using the personal preference of the at least one second person to generate corresponding altered media content; and (b) providing the corresponding altered media content in lieu of the selected media content for presenting to the at least one second person.

According to one or more embodiments, the disclosure may include a computer program product that includes a non-transitory computer readable storage device and program code on the computer readable storage device that when executed by a processor associated with an electronic device causes the electronic device to provide functionality of the above-described and additional method processes.

The present disclosure addresses issues that arise when a selected media content from one or more media content is being presented to at least one second person, given the understanding/appreciation that different people can perceive and react to the same media content differently. For example, when the selected media content includes a comedy skit, some people can perceive a joke in the comedy skit as funny, while other people can perceive the same joke as offensive. This can result in misunderstanding, embarrassment, or even rifts in personal and/or business relationships.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided names and reference numerals similar to those of the previous figure(s). The specific numerals assigned to the elements are provided solely to aid in the description and are not meant to imply any limitations (structural, functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

As provided herein, the term "media content" is not limited to only the media content stored in the electronic device, but can encompass media content provided by an external source and retrieved by the electronic device. Further, the media content can include a combination of one or more image information, audio information, video information, and/or other visual data.

As further described below, implementation of the functional features of the disclosure described herein is provided within processing devices and/or structures and can involve use of a combination of hardware, and firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted examples are not meant to imply architectural or other limitations with respect to the presently described embodiments and/or the present innovation generally. The description of the illustrative embodiments can be read in conjunction with the accompanying figures. Embodiments incorporating teachings of the present disclosure are shown and described with respect to the figures presented herein.

FIG. 1 depicts an example primary electronic device within which various aspects of the disclosure can be implemented to alter a media content being shared with at least one second person, according to one or more embodiments. Examples of such electronic devices include, but are not limited to, mobile devices, a notebook computer, a mobile phone, a digital camera, a smart watch, a tablet computer, and a communication device, etc. Electronic device 100 (also referred to as a first electronic device) includes processor 102, which is communicatively coupled to storage device 104, system memory 120, input devices, introduced below, output devices, such as display 130, and image capture device (ICD) controller 134. Processor 102 can include processor resources such as a central processing unit (CPU) that support computing, classifying, processing, and transmitting of data and information. Electronic device 100 includes a plurality of image capturing devices, presented as front and rear facing cameras 132, 133. The ICD controller 134 may perform or support functions such as, but not limited to, selecting and activating an active camera from among multiple cameras. Throughout the disclosure, the term image capturing device is utilized interchangeably with or is taken to be synonymous with and/or refer to any one of front or rear facing cameras 132, 133.

System memory 120 may be a combination of volatile and non-volatile memory, such as random-access memory (RAM) and read-only memory (ROM). System memory 120 can store program code or similar data associated with firmware 121, an operating system 122, communication (comm'n) module 123, camera control module (CCM) 124, applications 125, sharing module 126, and personal preference (or persona) identification module 128. Communication module 123 includes program code that is executed by processor 102 to enable electronic device 100 to communicate with other external devices and systems.

The sharing module 126 can be implemented to share selected media content accessible by the electronic device 100 to at least one second person (also referred to as a recipient of the shared media content). Different techniques can be used to share the selected media content to the at least one second person including using the electronic device 100 (e.g., via the sharing module 126) and/or using a second electronic device that the electronic device 100 can be communicatively connected with. In one or more embodiments, the sharing module 126 can be implemented to operate with the recipient identification module 145 which can determine the identity of the at least one second person. In one or more embodiments, the identity of the at least one second person can be determined from a sharing command and an identifier associated with the sharing command. For example, the identifier can be an email address or a phone number or other unique identifier (ID) of the at least one second person. In one or more embodiments, the recipient identification module 145 includes code that configures the processor to perform facial recognition (e.g., utilizing images captured by one of more of the ICDs 132, 133 of faces looking at or within view range of the display 130) to determine the identity of the at least one second person to whom the media content is being presented. As an example, while a selected media content is being shared to the at least one second person in a local sharing session (utilizing the device display or a connected second display), other people can join the sharing session, and facial recognition can be used to determine the identities of the people that join the sharing session. Similarly, facial recognition can also be used to determine the identities of the people leaving a sharing session. For one or more embodiments, the facial recognition operations can be performed in conjunction with the operations of the CCM 124.

For one or more embodiments, the personal preference of the at least one second person can be set up by the at least one second person. In other embodiments, the personal preference of the at least one person can be set up by the user of the electronic device 100. When set up by the at least one second person, the personal preference can be stored in cloud storage 195 and can be associated with an indicator or setting that indicates whether the at least one second person activates or deactivates his/her personal preference. For example, when the at least one second person activates his/her personal preference, the personal preference can be used by the alteration module 127 to alter a selected media content. The activation or deactivation of a personal preference can be updated by the at least one second person. The activation and deactivation settings can be stored together with the personal preference of the at least one second person in the cloud storage 195. When the user of the electronic device 100 sets up the personal preference of the at least one second person, the personal preference of the at least one second person can be stored in the personal preference repository 129 and can be considered to be activated.

The personal preference (or persona) repository 129 stores the personal preference of the at least one second person together with at least one personal preference type (e.g., religious personal preference type, cultural personal preference type, etc.). When the identity of the at least one second person is determined by the recipient identification module 145, the personal preference of the at least one second person can be retrieved from the personal preference repository 129. In one or more embodiments, when the at least one second person set up his/her own personal preference, at least part of the content of the personal preference repository 129 can be copied from the cloud storage 195, which is part of a cloud computing service available via the server computing system 190. The personal preference of the at least one second person, whether set up by the user 100 or set up by the at least one second person and downloaded from the cloud storage 195) can be associated with a second person contact or a list of common content sharing associates (i.e., one or more selected/identified second persons with whom content is normally/periodically shared). In one embodiment, personal preference repository 129 can be maintained in storage device 104.

In one or more embodiments, when the processor determines, by executing code of the personal preference identification module 128, that no personal preference has been established for the identified second person, the processor can execute code of the sharing module 126 to present the selected media content to that person without the need for alteration. Further, when a person has an established personal preference but that person's personal preference is not activated, then the processor can execute code of the sharing module 126 to present the selected media content to that person without alteration (e.g., the original content) as if the person has no established personal preference.

The alteration module 127 can alter the selected media content according to the personal preference of the at least one second person when the personal preference of the at least one second person has been established and is activated. For one or more embodiments, when the at least one second person includes multiple people, the alteration module 127 can analyze the personal preference of each of the multiple people to alter the selected media content. In one embodiment, a most conservative personal preference among the numerous personal preferences is selected to trigger the alteration of the media content when multiple people are consuming the content at the same time via a single presentation. However, in an alternate embodiment, when each of the multiple people receive individual copies of the media content, each person's copy of the content is individually altered (or not altered) based on that person's personal preference.

In one or more embodiments, the alteration module 127 can be implemented using artificial intelligence (AI) engine 135, which can include program code that can be trained to perform operations related to identifying one or more portions of the selected media content that are incompatible with the personal preference of the at least one second person. In one or more embodiments, the operations performed using AI engine 135 can include operations that alter the selected media content so that the selected media content no longer includes media content that is incompatible (or not aligned with) with the personal preference of the at least one second person. For example, the alteration of the selected media content can include changing the appearance of one or more objects included in the selected media content and/or causing an audio clip (or selected parts of the audio clip) in the selected media content to become inaudible. In one or more embodiments, the alteration module 127 can be implemented separately from the sharing module 126.

Although depicted as being separate from applications 125, the CCM 124, the sharing module 126, the personal preference identification module 128, and the communication module 123 may each be implemented as an application. Processor 102 loads and executes program code of the various modules stored in system memory 120. Examples of program code that may be loaded and executed by processor 102 include program code associated with communication module 123 and applications 125 and program code associated with sharing module 126, personal preference identification module 128, and recipient identification module 145.

Processor execution of the code of the sharing module 126 triggers the processor 102 to perform processes to identify how the selected media content is to be presented to the at least one second person. Processor execution of code of the sharing module 126 also triggers the processor 102 to perform processes to prepare the selected media content including any necessary alteration for presentation within a display. For example, the selected media content can be presented within a primary display or a secondary display of the electronic device 100. Depending on the personal preference of the at least one second person, the selected media content can be presented in its original form, or the selected media content can be presented in an altered form, where at least one portion of the selected media content is different from the original form. Execution of the code associated with the sharing module 126 can also cause the processor 102 to communicate with a second electronic device to transmit the selected media content in the altered form or alternatively in the original form, where alteration of the selected media content can be performed by the second electronic device. With both implementations, the corresponding/resulting altered form of the selected media content (also referred to as altered media content) can then be presented to the at least one second person within a display of the second electronic device.

According to one or more embodiments, electronic device 100 includes removable storage device (RSD) 105, which is inserted into an RSD interface (not shown) that is communicatively coupled via system interlink to processor 102. According to one or more embodiments, RSD 105 is a computer readable storage device encoded with program code and corresponding data, and RSD 105 can be interchangeably referred to as a non-transitory computer program product or non-transitory computer readable storage device having non-transitory computer readable program code/instructions. RSD 105 may have a version of sharing module 126 stored thereon, in addition to other program code. Processor 102 can access RSD 105 to provision electronic device 100 with program code that, when executed by processor 102, causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Front facing cameras (or image capture device (ICD)) 132 are communicatively coupled to ICD controller 134, which is communicatively coupled to processor 102. ICD controller 134 supports the processing of signals from front facing cameras 132. Front facing cameras 132 can capture images that are within the field of view (FOV) of image capture device 132. Electronic device 100 includes several front facing cameras 132. First front facing camera 132A is a main camera that captures a standard angle FOV. Second front facing camera 132B is wide angle camera that captures a wide angle FOV. Front facing cameras 132A and 132B can be collectively referred to as front facing cameras 132A-132B or front facing camera(s) 132. While two front facing cameras 132A-132B are shown, electronic device 100 can have more or less than two front facing cameras.

Electronic device 100 further includes several rear facing cameras 133. First rear facing camera 133A is a main camera that captures a standard angle FOV. Second rear facing camera 133B is wide angle camera that captures a wide angle FOV. Third rear facing camera 133C is a telephoto ICD that captures a telephoto FOV (zoom or magnified). Each rear facing camera 133A, 133B, and 133C is communicatively coupled to ICD controller 134, which is communicatively coupled to processor 102. ICD controller 134 supports the processing of signals from rear facing cameras 133A, 133B and 133C. Rear facing cameras 133A, 133B and 133C can be collectively referred to as rear facing cameras 133A-133C or rear facing cameras 133. While three rear facing cameras are shown, electronic device 100 can have less than three rear facing cameras, such as having only one or two rear facing cameras or can have more than three rear facing cameras. According to one aspect of the disclosure, front facing cameras 132 and rear facing cameras 133 can be utilized to identify which second persons are viewing the content being presented on the display 130 or second external display in order to determine preferences of the identified viewers and possibly trigger alteration/modification of the locally presented media content to match the determined viewer preferences.

Electronic device 100 can further include data port 198, charging circuitry 136, and battery 143. Electronic device 100 further includes microphone 108, one or more output devices such as speakers 144, and one or more input buttons 107*a*-107*n*. Input buttons 107*a*-107*n* may provide controls for volume, power, and image capture device 132. Microphone 108 can also be referred to as audio input device 108. Microphone 108 and input buttons 107*a-n* can also be referred to generally as input devices.

Electronic device 100 further includes wireless communication subsystem (WCS) 142, which is coupled to antennas 148*a*-148*n*. According to one or more embodiments, WCS 142 can include a communication module with one or more baseband processors or digital signal processors, one or more modems, and a radio frequency (RF) front end having one or more transmitters and one or more receivers. Wireless communication subsystem (WCS) 142 and antennas 148*a*-148*n* allow electronic device 100 to communicate wirelessly with wireless network 150 via transmissions of communication signals 194 to and from network communication devices 152*a*-152*n*, such as base stations or cellular nodes, of wireless network 150. In one embodiment, network communication devices 152*a*-152*n* contain electronic communication equipment to allow communication with electronic device 100.

Wireless network 150 further allows electronic device 100 to wirelessly communicate with second electronic devices 192, which can be similarly connected to wireless network 150 via one of network communication devices 152*a-n*. Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to wireless network 150. According to one or more embodiments, wireless network 150 can include one or more servers 190 that support exchange of wireless data and video and other communication between electronic device 100 and second electronic device 192.

Electronic device 100 further includes short range communication device(s) 164. Short range communication device 164 is a low powered transceiver that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, electronic device 100 can receive internet or Wi-Fi based calls via short range communication device 164. In one embodiment, electronic device 100 can communicate with WiFi router 196 wirelessly via short range communication device 164. In an embodiment, WCS 142, antennas 148*a-n* and short-range communication device(s) 164 collectively provide communication interface(s) of electronic device 100. These communication interfaces enable electronic device 100 to communicatively connect to at least one second electronic device 192 via at least one network. In one or more embodiments, the sharing of the selected media content performed by the sharing module 126 to a second electronic device 192 can be supported/established by a peer-to-peer connection using one of these short-range communication devices 164.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an in-coming call or message in order to provide an alert or notification to a user of electronic device 100. According to one aspect of the disclosure, display 130, speakers 144, and vibration device 146 can generally and collectively be referred to as output devices. Fingerprint sensor 147 can be used to provide biometric data to identify or authenticate a user. GPS device 160 can provide time data and location data about the physical location of electronic device 100 using geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. According to one or more embodiments, the measurements of these various sensors can also be utilized by processor 102 in the determining of the context of a communication. Electronic device 100 further includes housing 170 that contains/protects the components of electronic device 100.

Figure 2A:
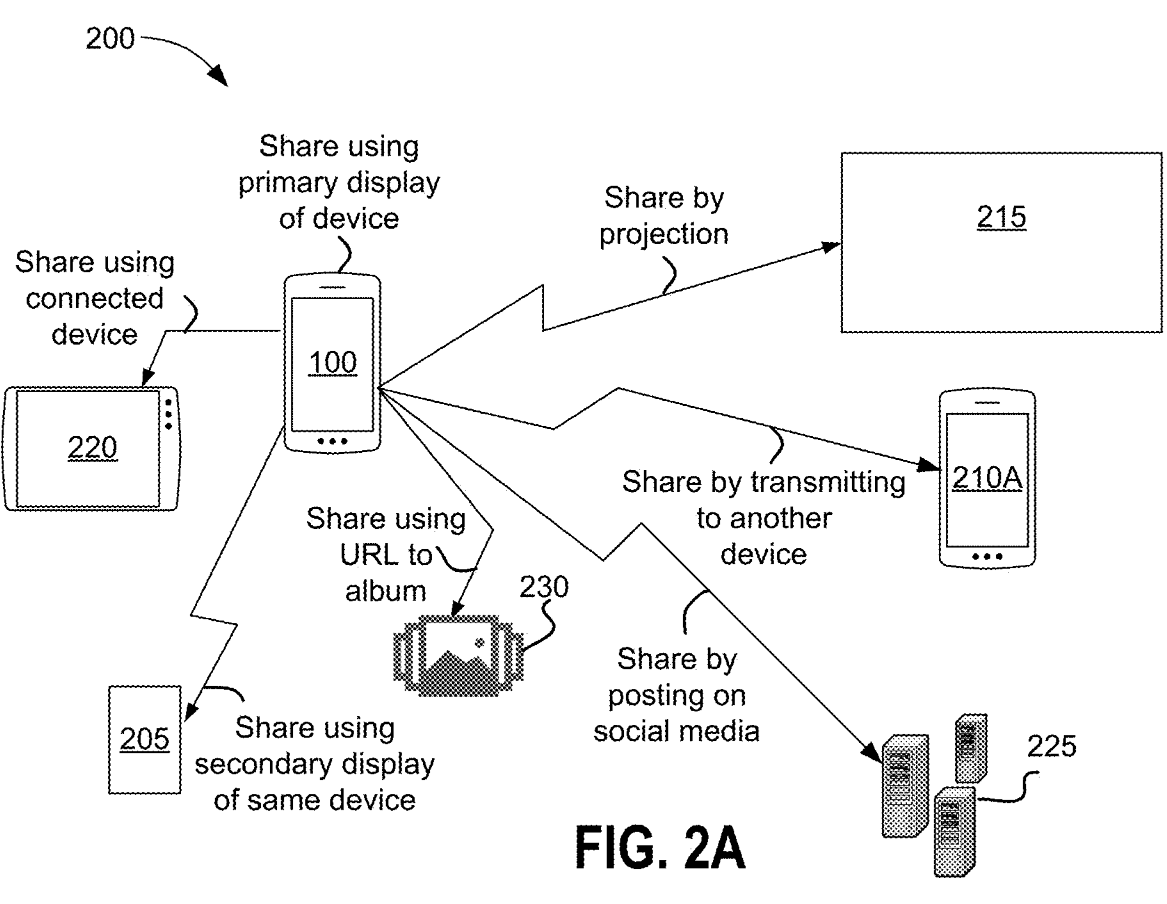
FIG. 2A depicts example connection/sharing scenarios by which an electronic device can share a selected media content with at least one second person, according to one or more embodiments.

FIG. 2A depicts example scenarios by which an electronic device can share and/or present a selected media content or an altered media content with the at least one second person, in accordance with one or more embodiments. In this example, a selected media content can be shared in its original form without any alteration, or an altered version of the selected media content can be shared (as altered media content). The selected media content can be altered by the alteration module 127 of the electronic device 100 based on the personal preference of the at least one second person. As shown in diagram 200, a selected media content or a corresponding altered media content can be shared with the at least one second person locally using the electronic device 100 or externally using other electronic devices.

For local sharing, in one or more embodiments, the selected media content or the corresponding altered media content can be shared and presented to the at least one second person by using the (primary) display 130 of the electronic device 100 or a secondary display 205 connected to the electronic device 100. For external sharing, in one or more embodiments, the selected media content or the corresponding altered media content can be shared and presented to the at least one second person by projecting onto an electronic surface 215 using, for example, screen casting or by transmitting to a connected device 220 using short-range communication such as, for example, Bluetooth®. The selected media content or the corresponding altered media content can also be shared by posting the content in a social media site associated with the server systems 225 or by storing the content in an electronic album 230 that can be established using a cloud-based storage associated with one or more server computing system (e.g., server 190 of FIG. 1) and accessed by selecting an assigned uniform resource locator (URL) link. As depicted in diagram 100, the server computing system 190 is communicatively connected to the cloud 193 (e.g., Amazon Web Services (AWS) cloud) to enable the electronic device 100 to access data (e.g., electronic album 230, copy of personal information repository 129, etc.) stored in the cloud storage 195.

In one or more embodiments, the selected media content or the corresponding altered media content can be shared by transmitting the content from the electronic device 100 to a second electronic device 210A, and then the content is presented to the at least one second person within a display of the second electronic device 210A. The directional arrows shown in FIG. 2A are used to convey the direction of the sharing of the selected media content or the corresponding altered media content from the electronic device 100.

Figure 2B:
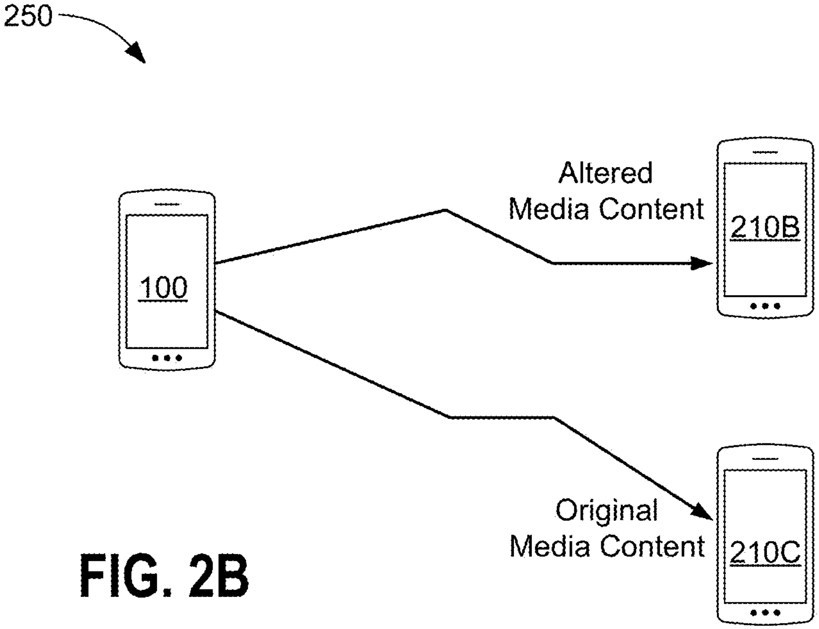
FIG. 2B depicts an example media content processing scenario within which the media content can be shared with at least two different people, according to one or more embodiments.

FIG. 2B depicts an example media content processing scenario within which a selected media content can be shared with two second people or two different second devices, which can be owned by two separate people, according to one or more embodiments. It is appreciated that, in one or more embodiments, the two second devices can be owned by the same second person, where one device is a personal device and the other device is a work or professional device, with each device having its own unique device identifier, such as a phone number. Accordingly, different personal preferences can be established for the professional device as compared to the personal preferences established for the personal device.

The alteration of a selected media content based on the personal preference of the at least one second person can be performed by the electronic device that is on the transmitting side of the sharing. Alternatively, the alteration of a selected media content based on the personal preference of the at least one second person can be performed by a second electronic device that is on the receiving end of the sharing. As shown in diagram 250, in a pre-processing sharing scenario, an altered media content can be generated by the electronic device 100 and shared with the second electronic device 210B. In a post-processing sharing scenario, a selected original media content can be transmitted by the electronic device 100 to the second electronic device 210C, and the altered media content can then be generated by the second electronic device 210C, if the second user has set up personal preferences and has the personal preference module toggled on for received media content. In order for the second electronic device 210C to be able to alter the selected media content received from the electronic device 100, in one or more embodiments, the second electronic device 210C can be configured with alteration and personal preference components and/or applications similar to those configured with electronic device 100 (FIG. 1).

FIG. 3 depicts a table with examples of different factors that can be used to alter a selected media content using the personal preferences of the at least one second person, according to one or more embodiments. As shown in diagram 300, there can be different "types" of personal preference 305 defined within a personal preference. The different types of personal preference can be related to religion 306, cultural 308, appearance 310, language 312, and morality 314, et al. The type of personal preferences can be previously received from the at least one second user and stored in the personal preference repository 129. For example, a personal preference questionnaire can be provided to the at least one second user to specify details about different types of personal preference. The personal preference can be provided/updated by the at least one second person and stored in a cloud-based storage 195, and can be downloaded to be processed by the electronic device 100. In one or more embodiments, the personal preference downloaded from the cloud-based storage 195 can be copied to and stored in the personal preference information 129.

In one or more embodiments, the personal preference of a second person can be set up by the user of the electronic device 100 instead of being provided by the second person. This scenario can occur when the second person is known or related to the user. For example, when the user of the electronic device 100 is related to the second person by a family relationship (e.g., father, mother), the user already has some knowledge of the personal preference of the second person, and can use that knowledge to set up the personal preference of the person. In another example, when the user of the electronic device 100 is related to the person by a working relationship (e.g., work supervisor, female co-worker), the user already has some knowledge of the personal preference of the person or the user knows what type of content should be blocked from being exposed to the person, and can use that knowledge to set up the personal preference of the person. When the settings of the personal preference for the person are completed by the user, the settings can be saved in the personal preference repository 129 and linked to the electronic contact information of the person such as, for example, the telephone number and/or the email address of the person.

As an example of a language type of personal preference, the at least one second person can prefer that any vulgar language included in a selected media content be removed before the selected media content is presented. As an example of an appearance type of personal preference, the at least one second person can prefer to exclude or cover up anyone in a selected media content who happens to be dressed with significant uncovered/unclothed areas of the body. As an example of a religion type of personal preference, the at least one second person can prefer to exclude any scenes or portions of content in a selected media content that include negative comments toward a religion that the at least one second person believes in or that promotes a particular religious dogma/doctrine that the at least one second person would prefer to not be exposed to. As an example of a cultural type of personal preference, the at least one second person can prefer that a selected media content not include any scenes that show disrespectful conduct toward elders in a family. As an example of a morality personal preference, the at least one second person can prefer that a selected media content block or exclude of any sexually explicit scenes. Although not depicted in FIG. 3, other types of personal preferences can also be included in the personal preference of the at least one second person.

As described, the personal preference can be established for the at least one second person and stored in the personal preference repository 129 (FIG. 1) of the electronic device 100. In certain scenarios, the at least one second person can decide not to have a personal preference established. In one or more embodiments, even with an established personal preference, the at least one second person can have the option of activating or deactivating the personal preference. FIG. 3 presents no (don't activate or deactivate) option 316 and yes (activate) option 318 under the preference activation 315. The user can toggle the personal preferences on or off by selecting either of the no option 316 or the yes option 318. In another embodiment, the toggle on/off is a single option button, where selection of the option button triggers the feature on and non-selection leaves the feature off.

In one or more embodiments, when the at least one second person activates his/her personal preference to avoid being exposed to certain content, the alteration module 127 of the electronic device 100 can perform operations to alter the selected media content based on the person's personal preference. It is appreciated that when the personal preference of a person is set up by the user of the electronic device 100 instead of being provided by the person (as described above), the determination of whether the personal preference of the person is activated is not applicable.

Different types of alteration 325 can be performed including removal operation(s) 326 where at least one portion of the selected media content is removed, replacement operation(s) 328 where at least one portion of the selected media content is replaced with another content, modification operation(s) 330 where at least one portion of the selected media content is at least partially modified, and deactivation operation(s) 332 where at least one portion of the selected media content is made not viewable and/or audible. Different types of alteration processing 335 can be performed to alter the selected media content. This includes pre-processing 336, where the alteration is performed by the electronic device 100, and post-processing where the alteration is performed by a second electronic device 210C (FIG. 2B) that receives the media content.

Figure 4A:
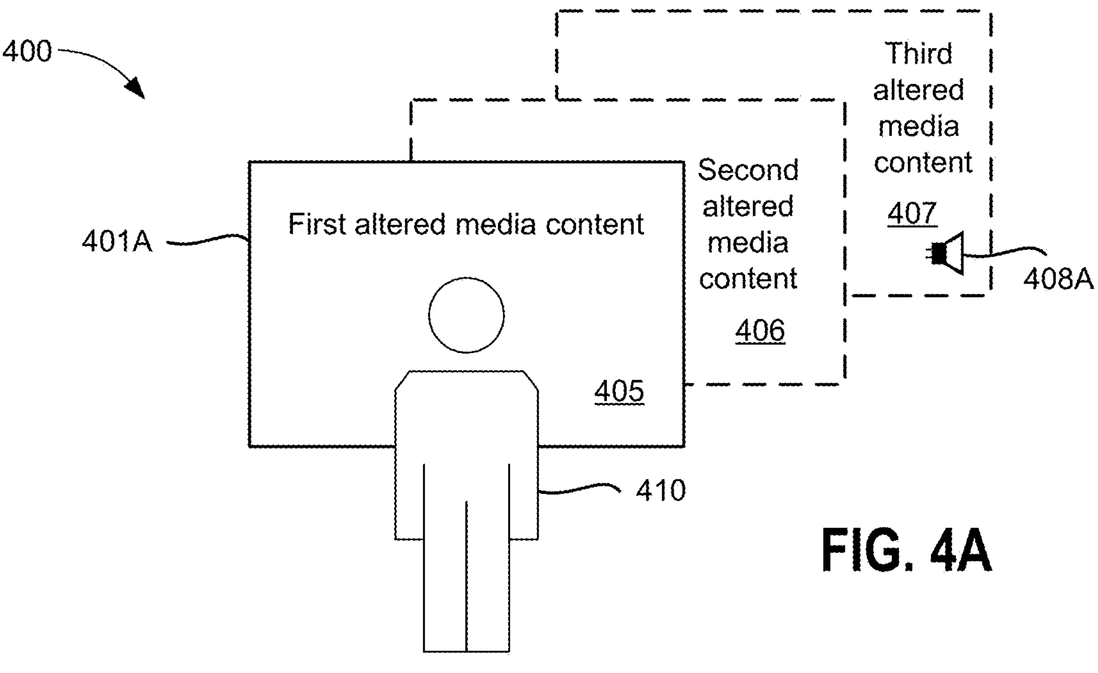
FIGS. 4A and 4B depict different example scenarios within which an altered media content is respectively presented to at least one second person and to multiple people, according to one or more embodiments.
Figure 4B:
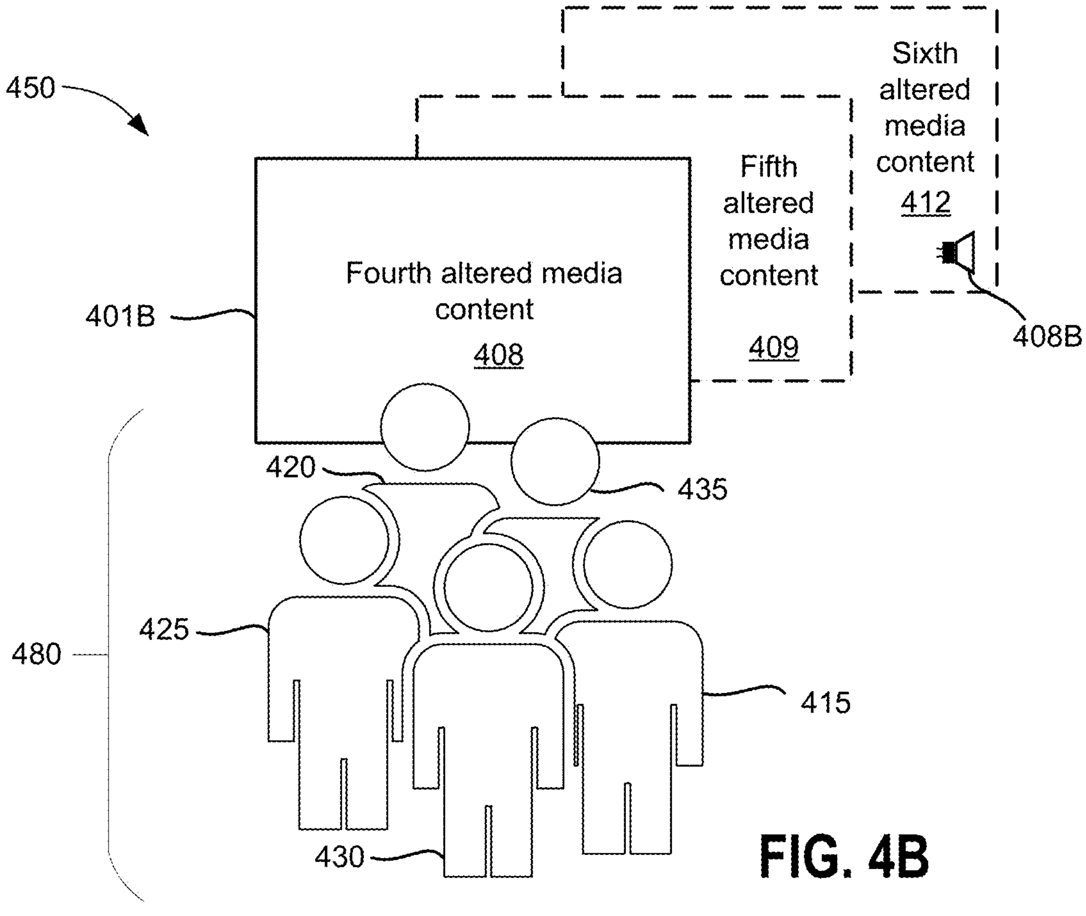

FIGS. 4A and 4B depict different example scenarios within which an altered media content is respectively presented to at least one second person and to multiple people, according to one or more embodiments. In one or more embodiments, a selected media content is shared with or presented to a known group of people, where the identities of the people in the group are known. For example, the identities of the people in the group are known because each person in the group may be required to register and sign in to view the presentation. Alternatively, or in addition, the identities of the people in the group are known because the person sharing the selected media content specifically identifies the people who can view the presentation. Knowing the identities of the people in the group can enable the recipient identification module 128 to use the identities to determine their personal preference from the personal preference repository 129 (FIG. 1). In one or more embodiments, as described herein, facial recognition can be used to identify the identities of the people in the group.

In diagram 400, a person 410 associated with an established personal preference is being presented with first media content via display 401A of the electronic device. The first media content can be an image of an example scene which can include many people engaging in many different activities such as a scene captured in a downtown location. One or more parts of the first media content can cause the person 410 to be exposed to certain types of representations that make the person 410 feel uncomfortable. In the scenario where the person 410 has an established personal preference and has activated the personal preference or the user of the device has established corresponding personal preferences of the person 410, the first media content can be altered to generate first altered media content 405. The person 410 can be presented with the first altered media content 405 instead of the first media content.

Diagram 400 also depicts the person 410 being presented with second media content via display 401A. The second media content can be an image of an example scene of people at a beach. In the scenario where the person 410 has expressed a preference of not wanting to view people who are scantily dressed, one or more parts of the second media content can be altered to remove or cover up the people that are scantily dressed to generate the second altered media content 406. In one embodiment, the AI engine 135 can perform operations to determine from an evaluation of a preview of the second media content that one or more persons have more than a threshold amount of their body uncovered or specific parts of their body uncovered (e.g., bare chest, stomach, upper legs/thigh, etc.). The person 410 viewing the display can be presented with the second altered media content 406 instead of the original, unaltered version of the second media content. In one or more embodiments, the preference of not wanting to view people showing a significant amount of skin can be limited to family members or relatives of the person 410, such that the person 410 does not feel uncomfortable with public scenes at the beach that include strangers but does feel uncomfortable when the scenes at the beach include family members or relatives showing uncovered parts of their bodies. In such situations, based on specific sharing and/or consumption settings and the facial recognition or other identification process to identify and associate the persons presented within the media content, the generation of the second altered media content 406 can be limited to when the scenes include family members or relatives of the person 410. In one or more embodiments, the AI engine 135 can be implemented using Generative Artificial Intelligence (GEN AI), which is a type of AI that uses large models to create new content, such as text, images, music, and videos.

Diagram 400 also depicts the person 410 being presented with third media content via display 401A. The third media content can be an example video of a social gathering where people socialize over alcoholic drinks and freely converse about different topics. The video can include one or more audio clips of people engaging in conversations while using offensive terms and phrases that can be audible over the speaker 408A where the conversations can be incompatible with the cultural, religion, and/or morality types of personal preferences of the person 410. One or more of the audio clips that include offensive terms and phrases can be altered (e.g., removed, muted, etc.) so that those clips are no longer audible. The person 410 viewing or listening to the third media content can be presented with the third altered media content 406 instead of the original, unaltered version of the third media content.

Diagram 450 depicts similar example scenarios of presenting a selected media content as the diagram 400 but the presentation is to a group of people 480 with different personal preferences. In the example depicted in diagram 450, the group of people 480 are to be presented with fourth media content (e.g., scene of a different downtown location), fifth media content (e.g., scene of a different beach location), and sixth media content (e.g., video of a different social gathering.) Based on the personal preference of one or more people in the group 480, the group 480 is presented with the fourth altered media content 408, fifth altered media content 409, and sixth altered media content 412 instead of the original, unaltered corresponding media content. The personal preference of each person in the group can be configured differently with regards to whether there is an established personal preference and whether the person activates the personal preference. For example, person 415 does not have a personal preference because the person 415 did not set up a personal preference, whereas person 420 has an established personal preference but has deactivated their personal preference setting because the person 420 does not want to have the personal preference applied to any selected media content. Person 425 has personal preferences, which were established by the user of the electronic device originating the media content, where the user knows of the preferences of person 425. Personal preferences of person 425 are automatically activated when established by the user. In addition, each of the persons 430 and 435 has established personal preferences, and both have activated their personal preferences.

Further, as described with FIG. 3, there can be different types of personal preferences such that even when the persons 425, 430, and 435 have activated their personal preferences, their personal preferences can be conflicting. For example, person 425 prefers to not have to view any portion of a selected media content that includes religious scenes, but is open to any other content, whereas person 435 does not mind viewing religious scenes but prefers to not have to view any portion of the selected media content that includes offensive language. In one or more embodiments, to resolve the possible conflicts, the personal preference identification module 145 evaluates the personal preferences of all the people in the group who have established personal preferences that are activated. It is appreciated that, in one or more embodiments, the personal preference of a person can be set up by the user of the electronic device 100 instead of being provided by the person (as described with FIG. 3). The personal preference identification module 145 can identify a most conservative personal preference from all the personal preferences. The most conservative personal preference can then be applied to a selected media content to generate an altered media content to be presented to all the people in the group. As such, even though the same selected media content is to be presented to the group of people with different personal preferences, the resulting altered media content 408, 409 and 412 depicted in FIG. 4B can be different from the altered media content 405, 406 and 407 depicted in FIG. 4A. In an extension of the present embodiment, the different people in the group can be assigned priority values, according to a weighted hierarchy, whereby the personal preference of one person (e.g., "grandma") can have a higher priority than the other persons in the group. The altered media content presented can then be based on the personal preferences of that one person with the highest priority.

Figures 5A, 5B:
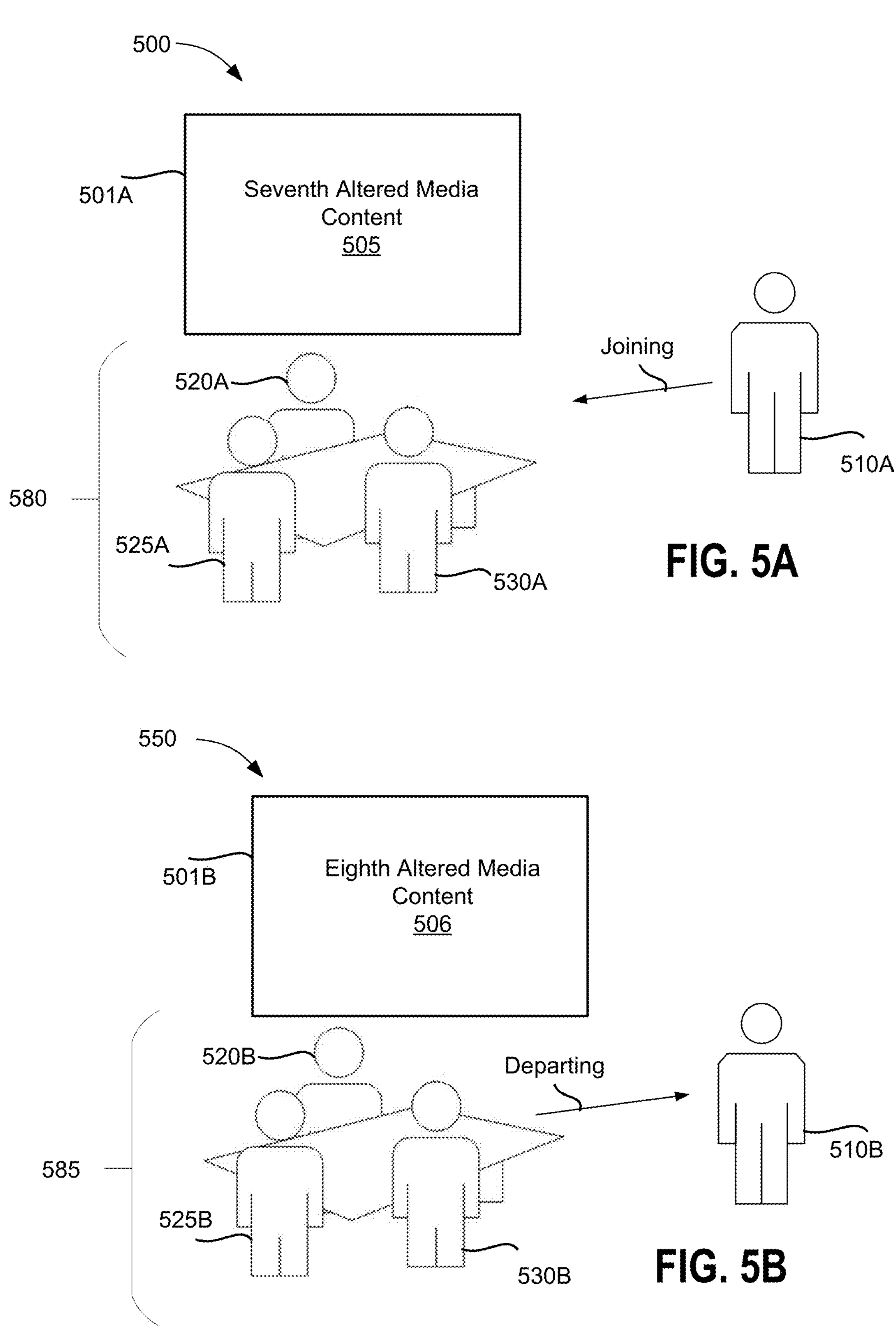
FIGS. 5A and 5B depict different example scenarios within which an altered media content can be updated to reflect a change in the people included within a group to which the altered media content is being presented, according to one or more embodiments.

FIGS. 5A and 5B depict different example scenarios within which an altered media content can be updated to reflect a change in the people included within a group to which the altered media content is being presented, according to one or more embodiments. Diagram 500 depicts a scenario where a seventh altered media content 505 is being presented to a group of people 580 that includes three persons 520A, 525A, and 530A via the display 501A. The seventh altered media content 505 was generated based on the combined personal preferences of the three persons 520A, 525A, and 530A. While the seventh altered media content 505 is being presented, a fourth person 510A who is not previously identified as a member of the group 580 consuming the seventh altered media content 505, decides to join the group viewing the seventh altered media content 505, as indicated by the directional arrow pointing toward the group 580. Since the fourth person 510A is not previously identified or unknown, facial recognition can then be performed by the recipient identification module 128 to determine the identity of the fourth person 510A. In the situation when the fourth person 510A can be recognized, and that person has an established personal preference (and optionally, opts in for the personal preference to be applied, if required), the personal preference of the fourth person 510A can be evaluated by the personal preference identification module 145 to determine whether that personal preference is more or less conservative than the personal preferences currently applied to the altered media content being presented. When the personal preference of the fourth person 510A is determined to be more conservative, that personal preference can be applied to the seventh altered media content 505 to generate an updated altered media content. The updated altered media content can then be presented to the four persons 510A, 520A, 525A and 530A. When the personal preference of the fourth person 510A is determined to be less conservative, that seventh altered media content 505 can continue to be presented to the four persons 510A, 520A, 525A and 530A. In one or more embodiments, in the situation when the facial recognition operations are unable to identify the fourth person 510A, the seventh altered media content 505 can continue to be presented to the four persons 510A, 520A, 525A and 530A, as if the fourth person 510A has no personal preference. As previously described, the personal preference of a person can be setup based on a working relationship. For example, the personal preference of the fourth person 510A can be set up by one of the persons 520A, 525A and 530A, based on a working relationship (e.g., employee-supervisor relationship) that the person has with the fourth person 510A. In this scenario, when the content of the seventh altered media content 505 is not aligned with the personal preference of the fourth person 510A, the seventh altered media content 505 can be updated to generate an updated altered media content.

In one or more embodiments, the facial recognition operations can also be used to identify people remaining in the group after someone has left the group. As depicted in diagram 550, the group 585 includes four persons 510B, 520B, 525B and 530B in a meeting. At some point during the meeting, the fourth person 510B decides to leave the group setting/location while an eighth altered media content 506 is being presented to the group 585. The departure of the fourth person 510B from the group 585 is indicated by the directional arrow pointing away from the group. When the fourth person 510B is identified to no longer be a member of the group 585, the personal preference of the fourth person 510B can be evaluated by the personal preference identification module 145 to determine whether that preference was a dominant preference that was used to generate the eighth altered media content 506, e.g., because the preference was the most conservative. In the situation when the personal preference of the fourth person 510B is determined to be the most conservative, then the personal preference of the three remaining persons 520B, 525B and 530B can be re-evaluated to determine a personal preference that is the next most conservative in order to generate an updated altered media content to be presented via the display 501B. In the situation when the personal preference of the fourth person 510B is determined to be less conservative than the personal preferences of the remaining three people 520B, 525B, and 530B, the presentation of the altered media content 506 can continue for the remaining people in the group 585. It is appreciated that, because the personal preference can vary among different people, each of the altered media content 405, 406, 407 of FIG. 4A, 408, 409, 410 of FIG. 4B, 505 of FIG. 5A and 506 of FIG. 5B can be different from one another.

For one or more embodiments, in the post-processing situation as described in FIG. 2B, the facial recognition operations can be performed by the second electronic device 210C. In one or more embodiments, when the selected media content is shared using an album 230 or by posting on a social media site via the server computing system 225, the facial recognition operations can be performed by the electronic device that is used to open the URL link or the associated app, or to access the social media site.

Figure 8:
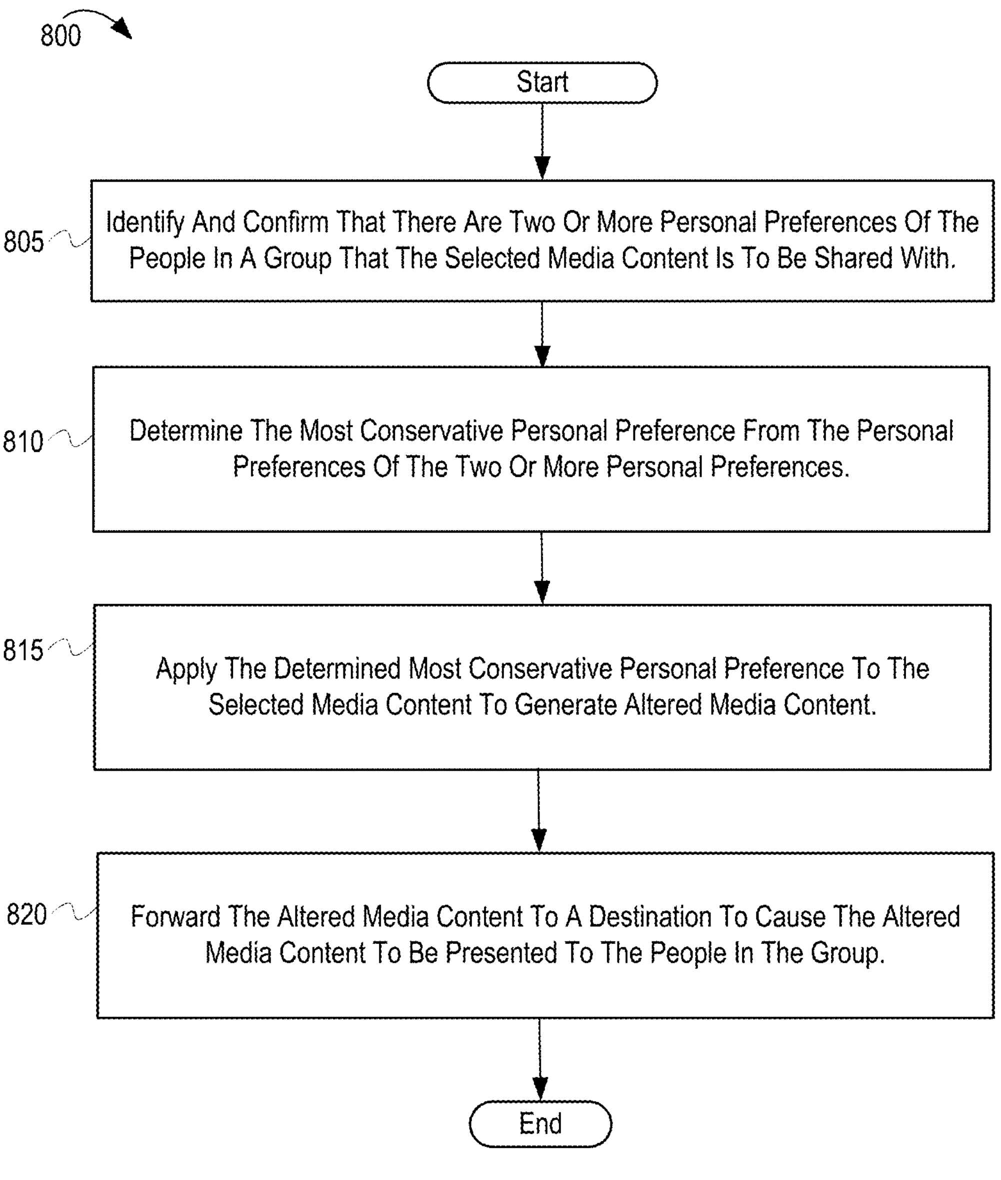
FIG. 8 depicts a method of using a most conservative personal preference of a person in a group of media content consumers to alter a selected media content, according to one or more embodiments.
Figure 9:
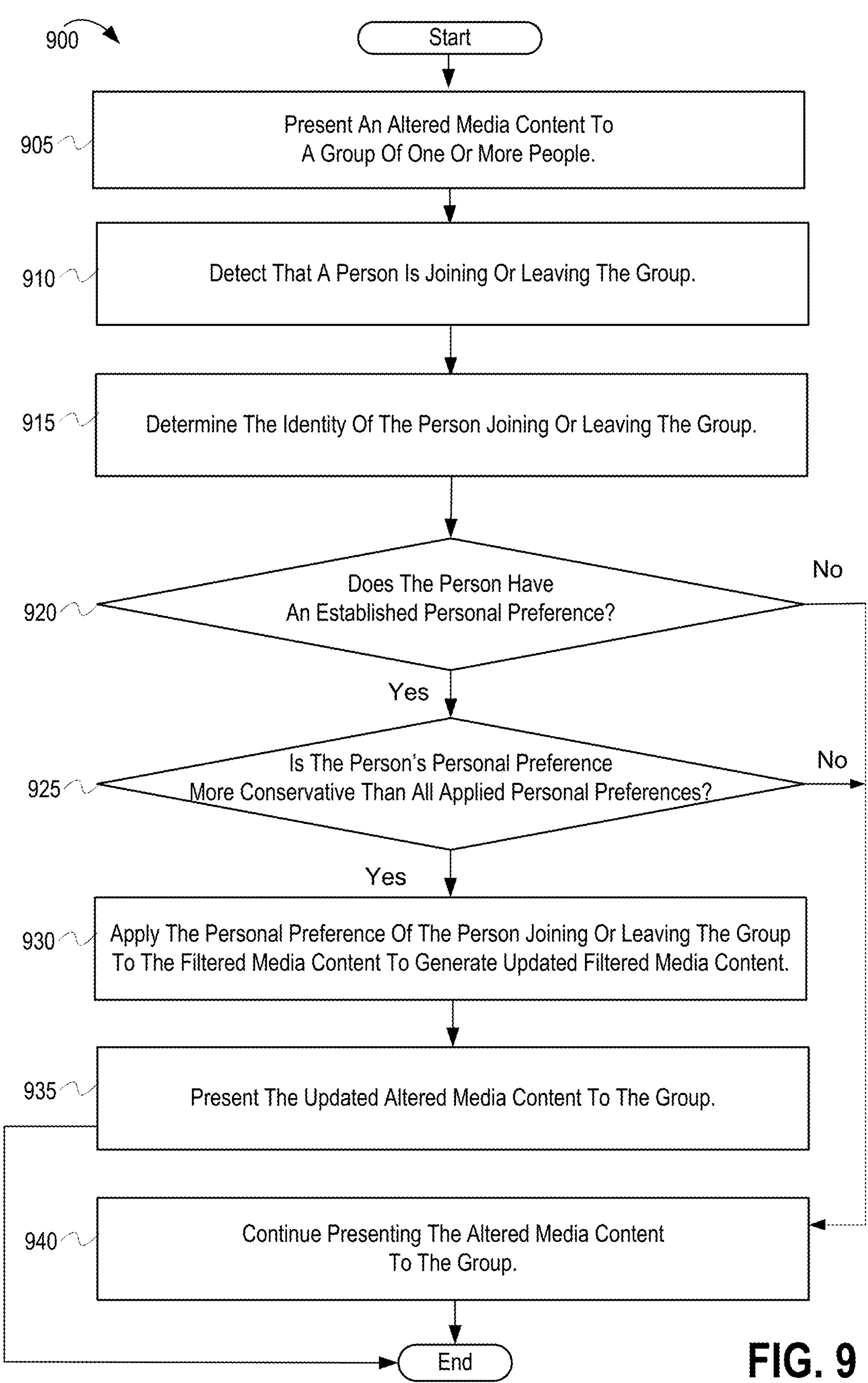
FIG. 9 depicts a method of dynamically updating an altered media content to adapt to changes in the people making up the group of people based on a person joining or leaving the group to whom the altered media content is being presented, according to one or more embodiments.
Figure 10:
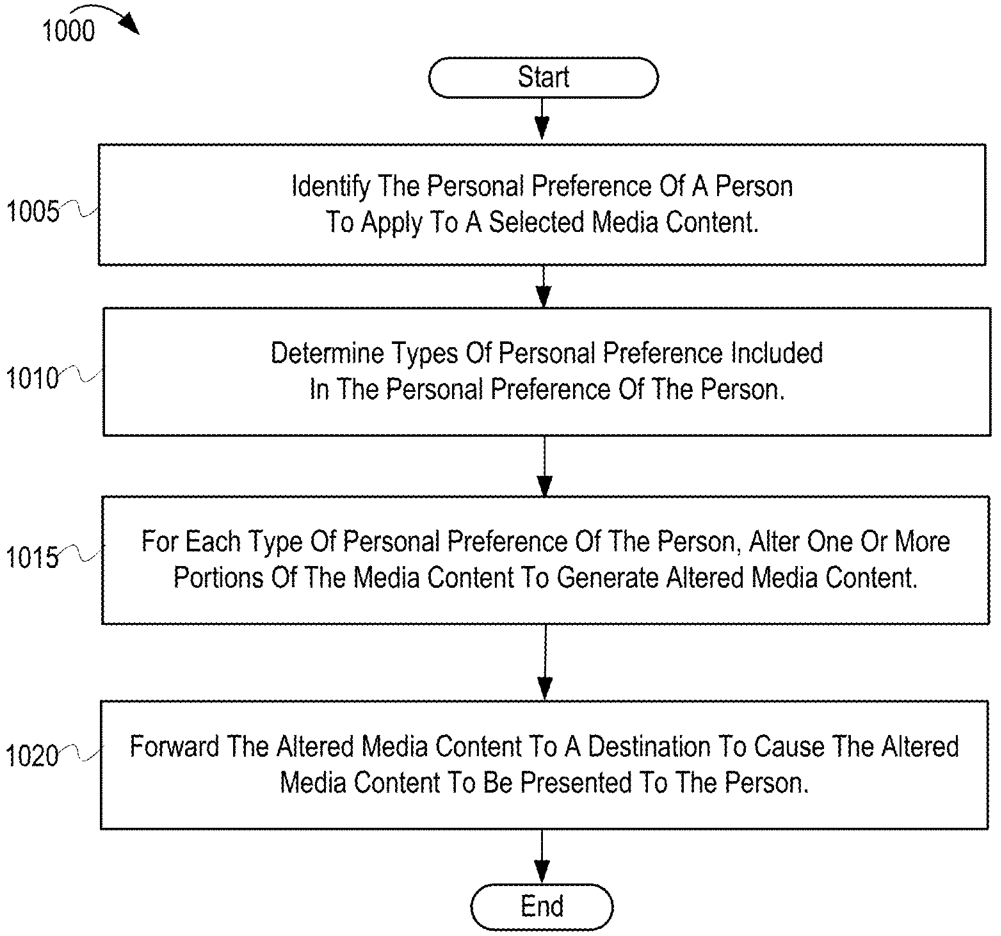
FIG. 10 depicts a method of altering media content based on different preference types in the personal preference of a person, according to one or more embodiments.
Figure 11:
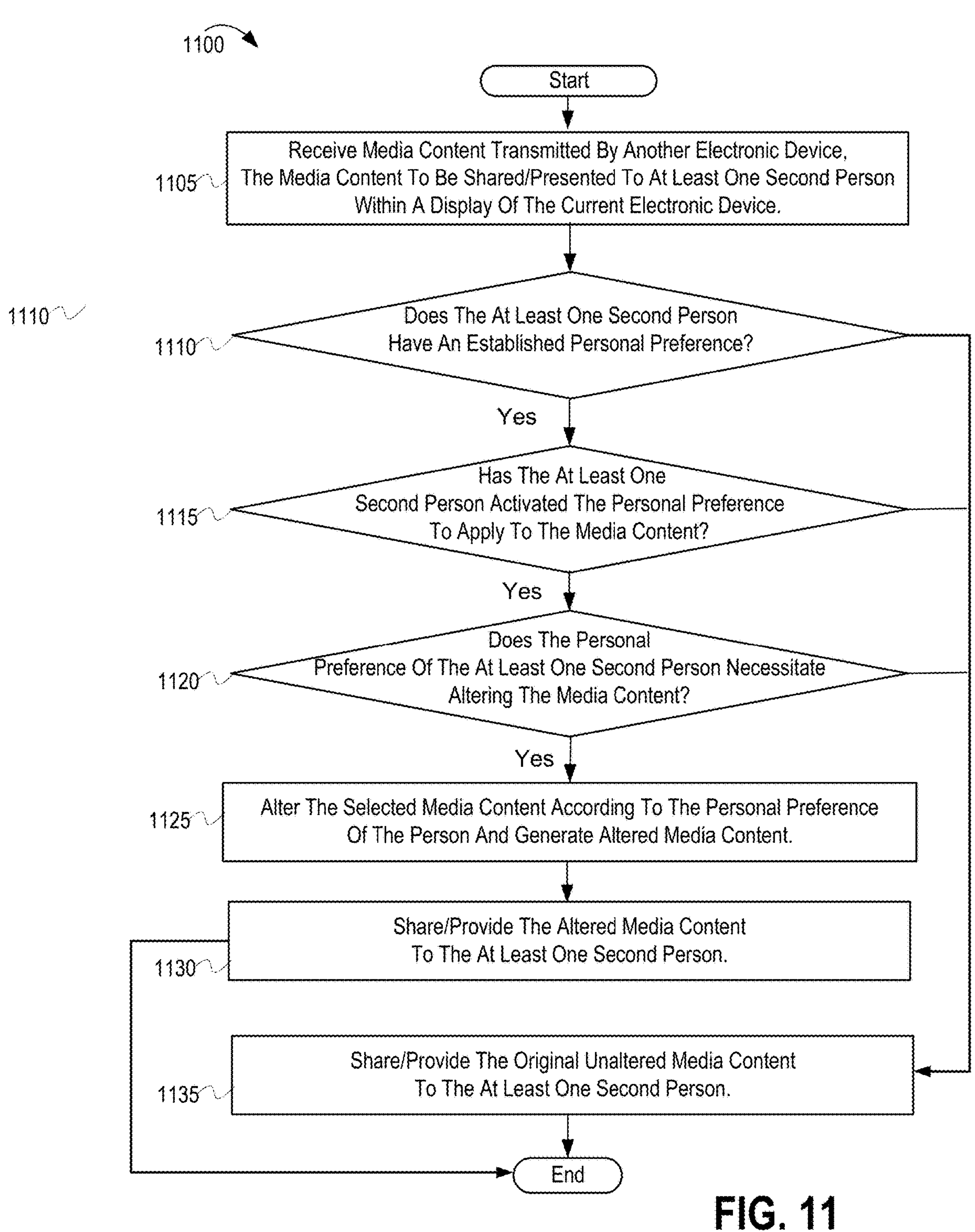
FIG. 11 depicts a method of altering a selected media content at the receiving device, after the selected media content is received from another electronic device, based on the preferences of the owner of the receiving device, according to one or more embodiments.

FIGS. 6-11 depict flow diagrams of different methods for determining whether and how to alter a selected media content to be shared and/or presented to at least one second person using a display associated with the electronic device 100 or a display associated with another electronic device communicatively connected with the electronic device 100, according to respective embodiments. The methods are implemented to alter at least a portion of a selected media content when the portion of the selected media content is determined to be incompatible with the personal preferences of the at least one second person. In at least one embodiment, in a pre-processing scenario, the electronic device 100 is controlled by processor 102, which executes code of the sharing module 126 (FIG. 1) and the alteration module 127 (including its AI code) to cause or configure the electronic device 100 to perform the functionality described for method 600 (FIG. 6), as well as method 700 (FIG. 7), method 800 (FIG. 8), method 900 (FIG. 9), and method 1000 (FIG. 10). Some of the described processes can be performed by the AI engine 135, operating within electronic device 100. In at least one embodiment, in a post-processing scenario, the second electronic device 210C (FIG. 2B) can be configured to execute code to perform the functionality described for method 1100 (FIG. 11).

In a pre-processing scenario, the electronic device 100 is configured to identify the personal preference of a person and apply that personal preference to a selected media content to generate altered media content to be presented/forwarded/transmitted/communicated to the at least one second person. In another pre-processing scenario, the electronic device 100 is configured to identify a most conservative personal preference from among multiple personal preferences of two or more people and apply the most conservative personal preference to a selected media content to generate an altered media content to be presented to the people in the group. The description of methods 600/700/800/900/1000/1100 is provided with general reference to the specific components illustrated within the preceding FIGS. 1-5, and specific components referenced in methods 600/700/800/900/1000/1100 may be identical or similar to components of the same name used in describing preceding FIGS. 1-5.

Figure 6:
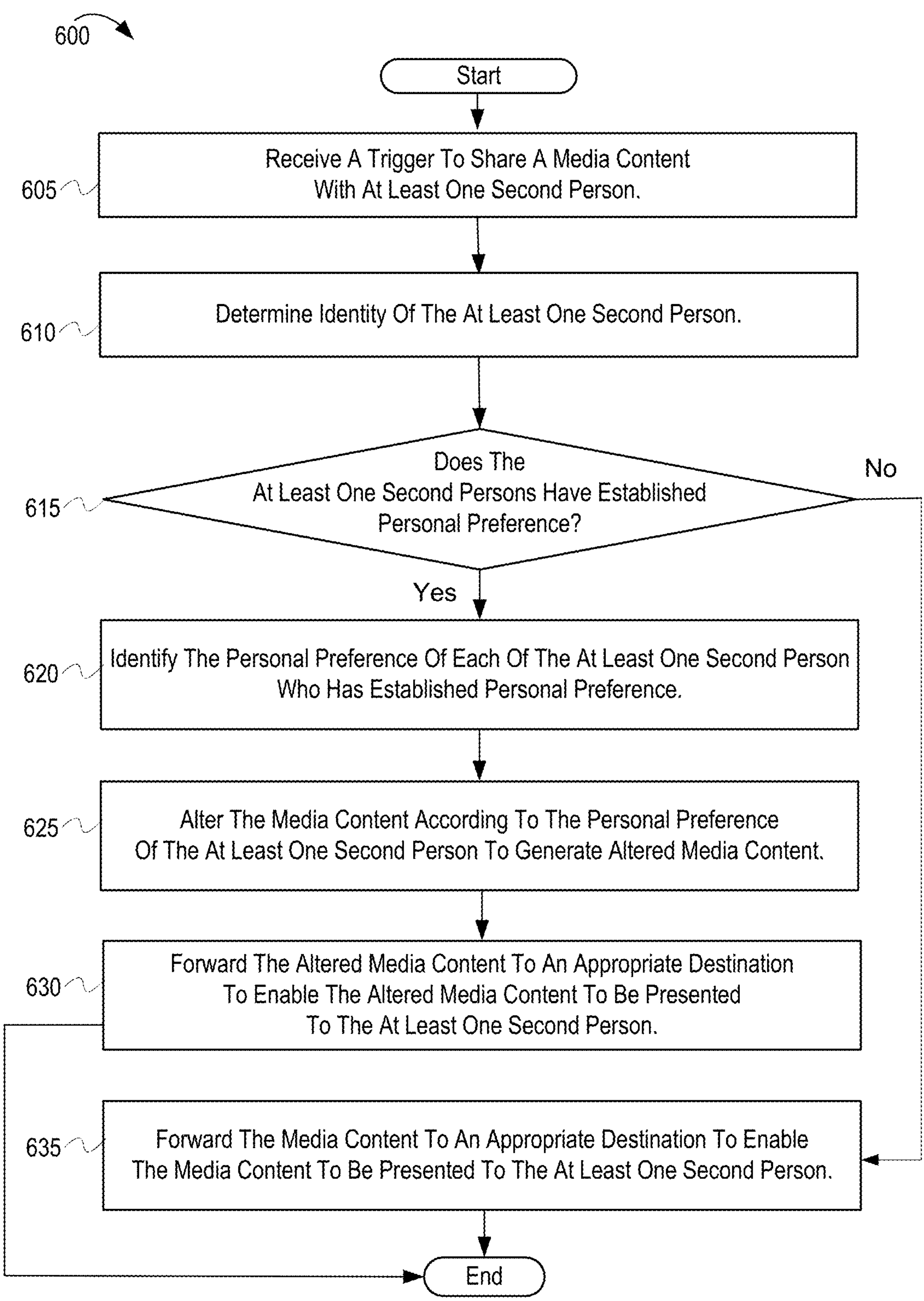
FIG. 6 depicts an example method for altering a media content based on a sharing trigger and based on the personal preferences of at least one second person to whom the media content is being forwarded for presentation, according to one or more embodiments.

FIG. 6 depicts an example method for altering a media content and sharing a resulting altered media content based on a sharing trigger and based on the personal preferences of the at least one second person. The altered media content is forwarded to a destination for presentation to the at least one second person, according to one or more embodiments. The method 600 can be performed using the electronic device 100 of FIG. 1 executing instructions of the sharing module 126 to share a selected media content with at least one second person using pre-processing as described in FIG. 2B. The method 600 starts at block 605 where a trigger to share a selected media content with at least one second person is received. The trigger can be initiated when a user of the electronic device 100 issues a share command. The share command can include information (e.g., email address or phone number) about the at least one second person that the selected media content is to be shared with.

At block 610, the method includes the processor performing operations of the recipient identification module 128 to determine the identity of the at least one second person using the information included in the share command. At block 615, the method includes the processor performing operations of the personal preference identification module 145 to determine whether the at least one second person has established a personal preference. When there is no established personal preference, and in the situation where there is only one second person, the method 600 can continue from block 615 to block 635 where the selected media content can be forwarded to a destination to enable the selected media content to be presented to the second person in its original (unaltered) form.

From block 615, when there is an established personal preference for the at least one second person, the processor performs operations of the personal preference identification module 145 at block 620 to retrieve the established personal preference of the at least one second person from the personal preference repository 129. The method includes the processor performing operations of the alteration module 127 at block 625 to apply the retrieved personal preference to the selected media content to generate altered media content. As described above with FIG. 3, the personal preference of a person can also be set up by the user of the electronic device 100, and the person may not even be aware that there is a personal preference set up for him/her.

At block 630, The method includes forwarding the altered media content can be forwarded to a destination to enable the altered media content to be presented to the second person. In one or more embodiments, when the at least one second person includes multiple people, the operations at blocks 615, 620, and 625 can include operations to determine and apply a most conservative personal preference, as described with FIG. 4B. In one or more embodiments, the generation of the altered media content is performed by operations of the AI code processing the alteration module 127 of the electronic device 100. Method 600 then ends.

Figure 7:
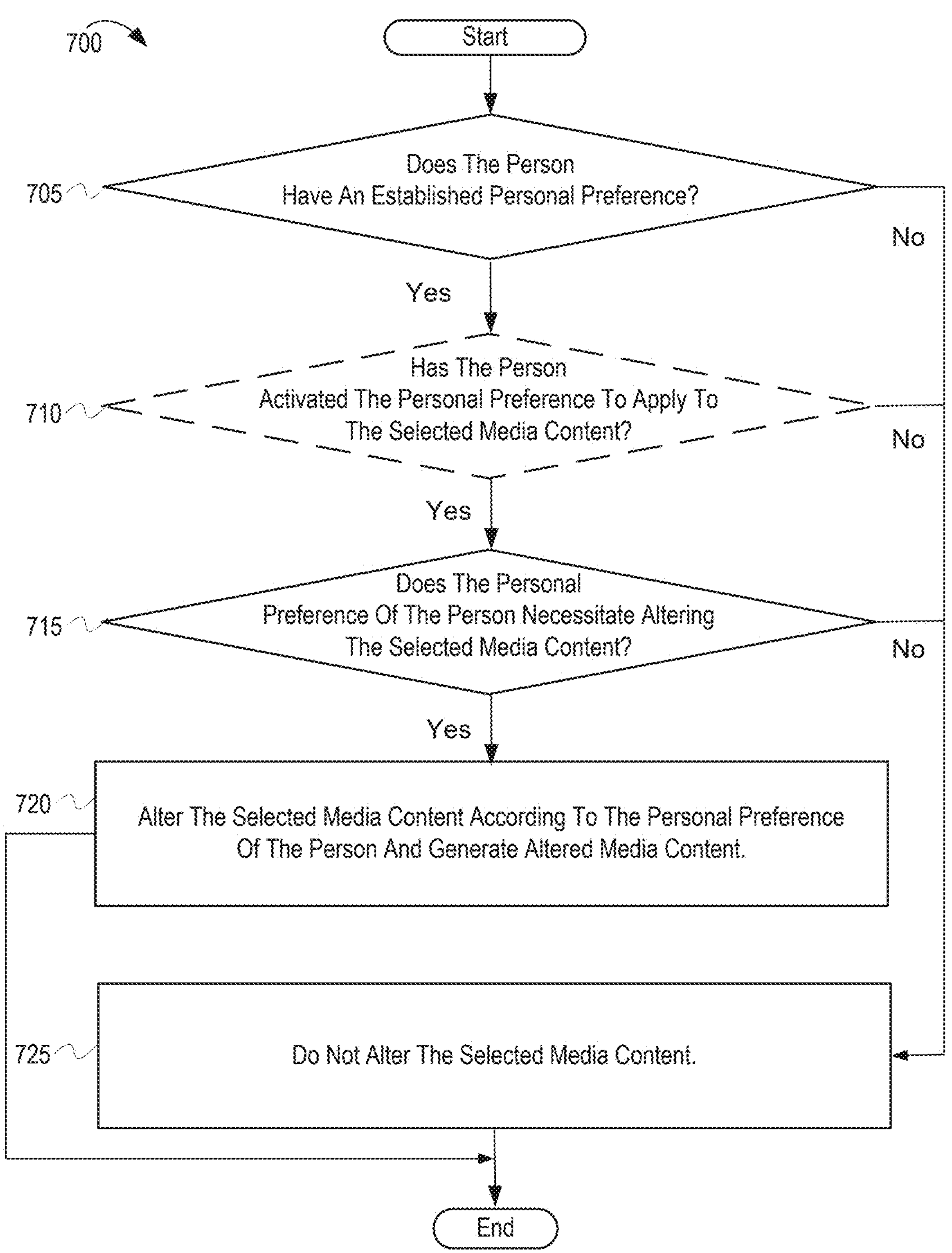
FIG. 7 depicts an example method of determining whether a selected media content needs to be altered for the at least one second person that the selected media content is being shared with, according to one or more embodiments.

FIG. 7 depicts an example method of determining whether a selected media content needs to be altered for the at least one second person that the selected media content is being shared with, according to one or more embodiments. The method 700 can be performed using the electronic device 100 of FIG. 1, with the processor executing instructions of the sharing module 126 to share a selected media content with at least one second person using pre-processing as described in FIG. 2B. The method 700 starts at block 705 where operations are performed by the processor to determine whether a person that a selected media content is to be shared with has an established personal preference. When the person has an established personal preference, the method 700 optionally continues from block 705 to block 710. When the person has no established personal preference, the method 700 continues from block 705 to block 725.

Dashed lines indicate that the process step at block 710 is completely optional and can be or is omitted in some implementations of the method. At optional block 710, operations are performed by the processor to determine whether the person has provided any indication that the person activates or deactivates the person's personal preference. As described above with FIG. 4B, a person has the option to activate or deactivate that person's personal preference to control whether the person's personal preference can be applied to a selected media content. Further, as described with FIG. 3, the user of the electronic device 100 can set up the person's personal preference, instead of the person setting up his/her own personal preference.

When there is an indication that the person has activated the personal preference, the method 700 continues from block 710 to block 715. When there is an indication that the person has not activated the personal preference, the method 700 continues from block 710 to block 725. When block 710 is not performed as a part of the processing of method 700, method 700 transitions from block 705 directly to block 715.

At block 715, operations are performed by the processor to determine whether it is necessary to apply the person's personal preference to the selected media content. For example, when the person's personal preference includes only information related to religious type of personal preference, and the selected media content does not include any scenes or audio clips about any religion, then it is not necessary for the selected media clip to be altered based on the person's personal preference. When alteration of the selected media content is necessary, the method 700 continues from block 715 to block 720 where operations are performed by the AI engine 135 to alter the selected media content based on the person's personal preference to generate an altered media content. When no alteration of the selected media content is necessary, the method 700 continues from block 715 to block 725.

At block 725, the selected media content can remain the same with no alteration because of one of the following reasons: the person has not established a personal preference, or optionally, the person has not activated the person's personal preference, or the application of the person's personal preference would not have any effect on the selected media content even if the person has an established personal preference (and optionally has activated the person's personal preference).

FIG. 8 depicts a method of using a most conservative personal preference of a person in a group to alter a selected media content, according to one or more embodiments. The method 800 starts at block 805 where operations are performed by the processor to identify and determine that the number of different personal preferences of the people that the selected media content is being shared with is two or more different personal preferences. At block 810, operations are performed by the processor or the AI engine 135 to compare the two or more personal preferences to determine a most conservative personal preference for the people in the group. For example, a most conservative personal preference can be a personal preference about someone's appearance, where wearing a covering from neck down to the knees is more conservative than wearing shorts and wearing a bikini. The evaluation of the personal preferences to determine a most conservative personal preference can be performed for each of the personal preference types. At block 815, the determined most conservative personal preference can be applied by the AI engine 135 to the selected media content to generate an altered media content. At block 820, the altered media content can be forwarded by the processor to a destination (e.g., a television or second display in a group meeting/viewing room) where the altered media content can be presented to the people in the group at the same time. It is noted that the people that the altered media content is presented to can include people who have not established a personal preference (and optionally people who deactivated their personal preference).

FIG. 9 depicts a method of dynamically updating an altered media content to adapt to changes in the number of people in a group of people that the altered media content is being presented to, according to one or more embodiments. The method 900 is used when an altered media content is being presented to a group of people. When an altered media content is being presented to a group of people, there can be instances of other people joining or leaving the group. For example, when a person joins a group, and that person has different established personal preferences from those of the group, then the altered media content being presented can be updated based on that person's personal preference. Similarly, when the same person later leaves the group, the updated, altered media content being presented can be returned to its previous form. Alternatively, when a different person leaves the group and that different person has their own personal preferences, the updated altered media content can be further updated to no longer account for that different person's personal preference. The effects on the altered media content are visible to everyone viewing the content when the person entering or the person leaving the group has the most conservative personal preference(s) or has other personality preferences (such as language or culture) that can affect the content being presented or the manner in which the content is being presented.

The method 900 starts at block 905 and can be formed in a scenario where an altered media content is being presented to a group of one or more people. The presentation of the altered media content can be performed using a display associated with the electronic device 100 or a display associated with another electronic device communicatively connected with the electronic device 100. At block 910, a trigger is received to indicate that either a person is leaving the group or is joining the group. At block 915, the identity of the person leaving or joining the group is determined. In one or more embodiments, the trigger of a person leaving or joining the group can occur and the identity of the person can be determined by the AI engine using facial recognition operations.

At block 920, operations are performed by the processor to determine whether the person joining the group or leaving the group has an established personal preference. When there is an established personal preference, the method 900 continues to block 925. When there is no established personal preference for the person, the method 900 continues from block 920 to block 940.

At block 925, operations are performed by the processor to determine whether the person's personal preference is the most conservative personal preference of all personal preferences of the people in the group or the personal preferences applied to the altered media content being presented. When the personal preference of the person joining or leaving the group is determined to be the most conservative, the method 900 continues from block 925 to block 930. When the personal preference of the person is determined not to be the most conservative (i.e., relative to the other personal preferences utilized/referenced when creating the altered media content), the method 900 continues from block 925 to block 940.

At block 930, the personal preference of the person leaving or joining the group is applied to alter the media content being presented to generate an updated, altered media content. For example, in the scenario where the person is joining the group, the person's personal preference can be applied to the altered media content to generate an updated, altered media content that is even more conservative. In the scenario where the person is leaving the group, the person's personal preference can be un-applied to the altered media content to generate an updated, altered media content that is less conservative. At block 935, the updated altered media content can then be presented to the group of people.

At block 940, when there is no established personal preference for the person joining or leaving the group or when the personal preference of the person is determined not to be the most conservative, the presentation of the altered media content to the group can be continued, without modification.

FIG. 10 depicts a process of altering the media content based on different preference types in the personal preference of a person, according to one or more embodiments. The method 1000 can be performed in a scenario where a selected media content is going to be presented to a person who has an established personal preference. At block 1005, the person can be identified, and the identity of the person utilized to retrieve the personal preference from the personal preference repository 129 (FIG. 1) can be determined. At block 1010, the personal preference of the person is examined to determine the included types of personal preference. As described with regard to FIG. 3, there can be different types of personal preferences including religion, cultural, appearance, language, and morality, etc. At block 1015, operations can be performed by the AI engine for each type of personal preference to alter one or more portions of the selected media content to generate an altered media content. At block 1020, the altered media content can be forwarded to a destination (e.g., a display device or a second electronic device) to enable the altered media content to be presented to the person.

FIG. 11 depicts a process of altering a selected media content after receiving the selected media content from another electronic device, according to one or more embodiments. The method 1100 can be performed in a scenario where a selected media content can be altered by a second electronic device 210C (FIG. 2B) that receives the selected media content from the electronic device 100. With this embodiment, the user of the receiving device sets up his/her preferences profile using the preferences user interface of FIG. 3, which is rendered on the user's device or an online preferences profile setup website. Also with this embodiment, the sending device does not have to be programmed to know and apply the personal preferences of the user of the receiving device, and the sending device does not alter the original video before transmitting to the receiving device. The method 1100 starts at block 1105 where the selected media content is received from the (sending/transmitting) electronic device 100. As noted above, the selected media content can be the original media content that has not been altered by the electronic device 100 based on any personal preferences. The selected media content is shared by the electronic device 100 with the second electronic device 210C so that the selected media content can be presented to one or more people associated with the second electronic device 210C. For example, the presentation of the selected media content can be performed by using a display associated with the second electronic device 210C. In one or more embodiments, the second electronic device 210C is configured with components and/or applications to perform operations related to altering a selected media content based on the personal preferences of at least one second person, as described with FIG. 1.

At block 1110, operations are performed by the processor to determine whether the at least one second person that a selected media content is to be shared with/presented to has an established personal preference. These operations can be performed by the second electronic device 210C. When the person has an established personal preference, the method 1100 continues from block 1110 to block 1115. When the person has no established personal preference, the method 1100 continues from block 1110 to block 1135.

At optional block 1115, operations are performed by the processor to determine whether the person has activated or deactivated the person's personal preference. When there is an indication that the person has activated the person's personal preference, the method 1100 continues from block 1115 to block 1120. When there is an indication that the person has deactivated the person's personal preference, the method 1100 continues from block 1115 to block 1135.

At block 1120, operations are performed by the processor to determine whether it is necessary to apply the person's personal preference to the selected media content. For example, when the person's personal preference includes only information related to religious type of personal preference, and the selected media content does not include any scenes or audio clips about any religion, then it is not necessary for the selected media clip to be altered based on the person's personal preference. When alteration of the selected media content is necessary, the method 1100 continues from block 1120 to block 1125 where operations are performed by the AI engine 135 to alter the selected media content based on the person's personal preference to generate an altered media content.

From block 1125, the method 1100 continues to block 1130 where the altered media content can then be shared or presented to the at least one second person. The presentation can be performed using a display associated with the second electronic device 210C or with an electronic display of a device communicatively connected with the second electronic device 210C.

From block 1120, when no alteration of the selected media content is necessary, the method 1100 continues to block 1135 where the original unaltered media content can be shared or presented to the at least one second person. Method 1100 then ends.

According to one or more embodiments, one or more of methods 600/700/800/900/1000/1100 further include the processor determining at least one type of personal preference from the personal preference of the at least one person, where the at least one type of personal preference is one from a group that includes (i) religious personal preference, (ii) cultural personal preference, (iii) appearance personal preference, (iv) language personal preference, and (v) morality personal preference, etc.

One or more of the methods 600/700/800/900/1000/1100 further includes the processor altering one or more portions of a selected media content to prevent the at least one second person from being exposed to specific types of representations within a selected media content. The at least one type of alteration to be performed includes at least one from a group of alterations that includes (i) removing the one or more portions from the selected media content, (ii) replacing the one or more portions of the selected media content with a different content, (iii) modifying the one or more portions of the selected media content, and (iv) deactivating the one or more portions of the selected media content.

One or more of the methods 600/700/800/900/1000/1100 further includes the processor performing one or more first operations to cause the one or more portions of the selected media content to be less visible, and/or to perform one or more second operations to cause the one or more portions of the selected media content to be less audible to avoid exposure of the at least one second person to specific types of representation within the selected media content.

One or more of the methods 600/700/800/900/1000/1100 further includes the processor performing one or more operations to alter a selected media content using the personal preference of the at least one second person to generate the corresponding altered media content, where the processor determines one or more types of personal preference from the personal preference of the at least one second person. For each determined type of personal preference, the processor analyzes the selected media content to identify whether one or more portions of the selected media content can trigger a potential negative response by the at least one second person because of the specific types of representations within the one or more portions of the selected media content. In response to identifying the potential negative response, the processor (or AI engine) alters the selected media content by altering the one or more portions of the selected media content.

One or more of the methods 600/700/800/900/1000/1100 further includes the electronic device having at least one consumer identifying input device coupled to the controller and configured to receive one or more inputs that enable identification of one or more consumers of media content being locally presented by the electronic device. The electronic device is locally presenting the media content on at least one of the display and an external display communicatively coupled to receive media content from the electronic device for local presentation. The processor further receives input from the at least one consumer identifying input device, and code to analyze the received input to identify which of the at least one consumer is present while the media content is scheduled to be locally presented.

One or more of the methods 600/700/800/900/1000/1100 further includes the electronic device having at least one consumer identifying input device coupled to the controller and configured to receive one or more inputs that enable identification of one or more consumers of media content being remotely presented by the electronic device. The electronic device is remotely presenting the media content on at least one of the display and an external display communicatively coupled to receive media content from the electronic device for remote presentation. The processor further receives input from the at least one consumer identifying input device, and analyzes the received input to identify which of the at least one consumer is present while the media content is scheduled to be remotely presented.

One or more of the methods 600/700/800/900/1000/1100 further includes the processor, in response to a trigger to locally present the selected media content to the at least one consumer: (i) determining/confirming whether the personal preference has been established for the at least one consumer; and (ii) in response to confirming that the personal preference has been established for the at least one consumer: (a) filtering the selected media content using a most conservative personal preference among the personal preference of each of the at least one consumers to generate corresponding filtered media content; and (b) locally presenting the corresponding filtered media content to the at least one consumer.

One or more of the methods 600/700/800/900/1000/1100 further include the processor identifying each of the at least one consumers for the selected media content, transmitting a request for corresponding personal preference data from a personal preference repository, and applying the personal preference for each of the at least one consumers having the corresponding personal preference data available within the personal preference repository.

Aspects of the present innovation are described above with reference to flowchart illustrations and/or block diagrams of methods, apparatuses (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc., are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive. Moreover, contemplated embodiments are not limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular uses contemplated.

What is claimed is:

1. An electronic device comprising:

a memory that stores program code and data comprising a media content presentation module, a recipient identification module, a personal preference identification module, a sharing module, and an alteration module;

a communications subsystem configurable to connect the electronic device to one or more second devices; and a controller communicatively connected to the memory and the communications subsystem, and which is configured to cause the electronic device to:

in response to a presentation of selected media content to at least one consumer:

determine, by accessing a personal preference repository, whether a personal preference has been established for the at least one consumer of the selected media content, the personal preference correlated to a preference associated with the at least one consumer to avoid exposure to specific types of representations that can exist within the selected media content, the personal preference repository comprising types of personal preference comprising: religious personal preference; cultural personal preference; appearance personal preference; language personal preference; and morality personal preference; and in response to confirming that the personal preference has been established for the at least one consumer:

filter the selected media content using the personal preference of the at least one consumer to generate corresponding filtered media content; and presents the corresponding filtered media content in lieu of the selected media content to the at least one consumer wherein, for external sharing to the at least one consumer, the processor is configured to cause the electronic device to screen cast or transmit the corresponding filtered media content to an external device for presenting on/via a display of the external device in place of the primary display of the electronic device.

2. The electronic device of claim 1, wherein, in filtering the selected media content using the personal preference of the at least one consumer to generate the corresponding filtered media content, the controller is configured to:

determine the one or more types of personal preference from the personal preference of the at least one consumer;

for each determined type of personal preference, analyze the selected media content to identify whether one or more portions of the selected media content can trigger a potential negative response by the at least one consumer because of the specific types of representations within the one or more portions of the selected media content; and in response to identifying the potential negative response, filter the selected media content by altering the one or more portions of the selected media content to avoid exposure by the at least one consumer to the specific types of representations within the media content.

3. The electronic device of claim 1, wherein to alter the one or more portions, the controller performs at least one type of alteration from a group of alterations comprising:

remove the one or more portions from the selected media content;

replace the one or more portions of the selected media content with a different content;

modify the one or more portions of the selected media content; and deactivate the one or more portions of the selected media content.

4. The electronic device of claim 3, wherein to avoid the exposure to the specific types of representations within the selected media content, the controller:

based on identifying that the one or more portions of the selected media content includes visual data, performs one or more first operations to cause the one or more portions of the selected media content to be less visible; and based on identifying that the one or more portions of the selected media content includes audio data, performs one or more second operations to cause the one or more portions of the selected media content to be less audible.

5. The electronic device of claim 4, wherein:

in order to cause the one or more portions of the selected media content to be less visible, the controller performs one or more first operations to modify an appearance of one or more objects when the one or more objects presents visual features that is determined to not be acceptable for viewing by the at least one consumer; and in order to cause the one or more portions of the selected media content to be less audible, the controller performs one or more second operations to remove one or more audio clips when the one or more audio clips is determined to be offensive to the at least one consumer.

6. The electronic device of claim 1, wherein to determine whether the personal preference has been established for the at least one consumer, the controller is configured to:

determine whether the at least one consumer has selected an option to be presented with filtered media content based on the personal preference;

in response to the at least one consumer having selected the option to be presented with the filtered media content, identify the personal preference of the at least one consumer; and in response to the at least one consumer not having selected the option to be presented with the filtered media content, present the selected media content to the at least one consumer without filtering.

7. The electronic device of claim 1, wherein the electronic device is a sending device that transmits the selected media content to at least one second electronic device that is a receiving device each second electronic device having a corresponding second output device, and the controller is configured to:

in response to a trigger to share the selected media content to at least one receiving device associated with the at least one consumer for remote presentation via the corresponding second output device:

determine whether the personal preference has been established for the at least one consumer of the second electronic device; and in response to confirming that the personal preference has been established for the at least one consumer of the second electronic device:

filter the selected media content using respective personal preference of each of the at least one consumer to generate corresponding filtered media content; and transmit the corresponding filtered media content to each of the at least one second electronic device for presentation via the corresponding second output device, wherein a copy of the media content is individually altered to generate respective corresponding filtered media content based on the personal preference for each of the at least one consumer.

8. The electronic device of claim 1, further comprising:

at least one consumer identifying input device coupled to the controller and configured to receive one or more inputs that enable identification of one or more consumers of media content being locally presented by the electronic device;

wherein the electronic device is locally presenting the media content on at least one of a display and an external display communicatively coupled to receive media content from the electronic device for local presentation; and the controller is further configured to:

receive input from the at least one consumer identifying input device;

analyze the received input to identify which of the at least one consumer is present while the media content is scheduled to be locally presented; and identify when there are multiple consumers present, each having a different personal preference.

9. The electronic device of claim 8, wherein the controller is configured to:

in response to a trigger to locally present the selected media content to the multiple consumers:

determine which personal preference has been established for each of the multiple consumers;

filter the selected media content using a most conservative personal preference among the personal preferences of each of the multiple consumers to generate corresponding filtered media content; and locally present the corresponding filtered media content to the multiple consumers.

10. The electronic device of claim 1, wherein the controller is configured to:

identify each of the at least one consumer for the selected media content;

transmit a request for corresponding personal preference data from a personal preference repository; and apply the personal preference for each of the at least one consumer having the corresponding personal preference data available within the personal preference repository.

11. A method comprising:

in response to a receiving a trigger to present a selected media content, determining, by a processor of an electronic device accessing a personal preference repository, whether a personal preference has been established for at least one consumer of the selected media content, the personal preference correlated to a preference associated with the at least one consumer to avoid exposure to specific types of representations that can exist within the selected media content, the personal preference repository comprising types of personal preference comprising: religious personal preference; cultural personal preference; appearance personal preference; language personal preference; and morality personal preference; and in response to confirming that the personal preference has been established for the at least one consumer:

filtering, by an artificial intelligence (AI) engine, the selected media content using the personal preference of the at least one consumer to generate corresponding filtered media content; and presenting the corresponding filtered media content in lieu of the selected media content to the at least one consumer, wherein, for external sharing to the at least one consumer, the processor is configured to cause the electronic device to screen cast or transmit the corresponding filtered media content to an external device for presenting on/via a display of the external device in place of the primary display of the electronic device.

12. The method of claim 11, wherein filtering the selected media content using the personal preference of the at least one consumer to generate the corresponding filtered media content comprises:

determining one or more types of personal preference from the personal preference of the at least one consumer;

for each determined type of personal preference, analyzing the selected media content to identify whether one or more portions of the selected media content can trigger a potential negative response by the at least one consumer because of the specific types of representations within the one or more portions of the selected media content; and in response to identifying the potential negative response, filtering the selected media content by altering the one or more portions of the selected media content to avoid exposure by the at least one consumer to the specific types of representations within the media content.

13. The method of claim 11, wherein altering the one or more portions comprises performing at least one type of alteration from a group of alterations comprising:

removing the one or more portions from the selected media content;

replacing the one or more portions of the selected media content with a different content;

modifying the one or more portions of the selected media content; and deactivating the one or more portions of the selected media content.

14. The method of claim 11, wherein avoiding the exposure to the specific types of representations within the selected media content comprises:

based on identifying that one or more portions of the selected media content includes visual data, performing one or more first operations to cause the one or more portions of the selected media content to be less visible, the one or more first operations comprising modifying an appearance of one or more objects when the one or more objects presents visual features that is determined to not be acceptable for viewing by the at least one consumer; and based on identifying that the one or more portions of the selected media content includes audio data, performing one or more second operations to cause the one or more portions of the selected media content to be less audible, the one or more second operations comprising removing one or more audio clips when the one or more audio clips is determined to be offensive to the at least one consumer.

15. The method of claim 11, wherein determining whether the personal preference has been established for the at least one consumer comprises:

determining whether the at least one consumer has selected an option to be presented with filtered media content based on the personal preference;

in response to the at least one consumer having selected the option to be presented with the filtered media content, identifying the personal preference of the at least one consumer; and in response to the at least one consumer not having selected the option to be presented with the filtered media content, presenting the selected media content to the at least one consumer without filtering.

16. The method of claim 11, wherein the electronic device is a sending device that transmits the selected media content to at least one second electronic device that is a receiving device, each second electronic device having a corresponding second output device, the method further comprising:

in response to a trigger to share the selected media content to at least one receiving device associated with the at least one consumer for remote presentation via the corresponding second output device:

determining whether the personal preference has been established for the at least one consumer of the second electronic device; and in response to confirming that the personal preference has been established for the at least one consumer of the second electronic device:

filtering the selected media content using respective personal preference of each of the at least one consumer to generate corresponding filtered media content; and transmitting the corresponding filtered media content to each of the at least one second electronic device for presentation via the corresponding second output device, wherein a copy of the media content is individually altered to generate respective corresponding filtered media content based on the personal preference for each of the at least one consumer.

17. The method of claim 11, wherein at least one consumer identifying input device is coupled to a controller and configured to receive one or more inputs that enable identification of one or more consumers of media content being locally presented by the electronic device, wherein the electronic device is locally presenting the media content on at least one of a display and an external display communicatively coupled to receive media content from the electronic device for local presentation; and the method further comprising:

receiving input from the at least one consumer identifying input device;

analyzing the received input to identify which of the at least one consumer is present while the media content is scheduled to be locally presented; and identifying when there are multiple consumers present, each having a different personal preference.

18. The method of claim 17, further comprising:

in response to a trigger to locally present the selected media content to the at least one consumer:

determining which personal preference has been established for each of the multiple consumers; and filtering the selected media content using a most conservative personal preference among the personal preference of each of the multiple consumers to generate corresponding filtered media content; and locally presenting the corresponding filtered media content to the multiple consumers.

19. A computer program product comprising:

a non-transitory computer readable storage device; and program code on the computer readable storage device that when executed by a processor associated with an electronic device, the program code enables the electronic device to provide functionality of:

in response to a receiving a trigger to present a selected media content, accessing a personal preference repository and determining whether a personal preference has been established for at least one consumer of the selected media content, the personal preference correlated to a preference associated with the at least one consumer to avoid exposure to specific types of representations that can exist within the selected media content, the personal preference repository comprising types of personal preference comprising: religious personal preference; cultural personal preference; appearance personal preference; language personal preference; and morality personal preference; and in response to confirming that the personal preference has been established for the at least one consumer:

filtering, by an artificial intelligence (AI) engine, the selected media content using the personal preference of the at least one consumer to generate corresponding filtered media content; and presenting the corresponding filtered media content in lieu of the selected media content to the at least one consumer, wherein, for external sharing to the at least one consumer, the processor is configured to cause the electronic device to screen cast or transmit the corresponding filtered media content to an external device for presenting on/via a display of the external device in place of the primary display of the electronic device.

* * * * *